United States Patent [19]
Stedman et al.

[11] Patent Number: 6,081,837
[45] Date of Patent: *Jun. 27, 2000

[54] METHOD OF ACCESSING INFORMATION ON A HOST COMPUTER FROM A CLIENT COMPUTER

[75] Inventors: Steven Matthew Stedman; Glenn Edward Gervais; Kevin MacFarland Mills, all of Bellingham; Michael William Miller, Seattle; David Neal Brim, Custer, all of Wash.

[73] Assignee: Wall Data Incorporated, Kirkland, Wash.

[ * ] Notice: This patent is subject to a terminal disclaimer.

[21] Appl. No.: 09/302,234

[22] Filed: Apr. 29, 1999

Related U.S. Application Data

[63] Continuation of application No. 08/762,266, Dec. 9, 1996, Pat. No. 5,968,119.

[51] Int. Cl.[7] ................................................. G06F 13/00
[52] U.S. Cl. ............................................................. 709/219
[58] Field of Search ................................... 709/200, 201, 709/203, 217, 218, 219

[56] References Cited

U.S. PATENT DOCUMENTS

| | | |
|---|---|---|
| 5,045,994 | 9/1991 | Belfer et al. . |
| 5,185,857 | 2/1993 | Rozmanith et al. . |
| 5,572,643 | 11/1996 | Judson . |
| 5,754,830 | 5/1998 | Butts et al. . |
| 5,968,119 | 10/1999 | Stedman et al. .................. 709/219 |

OTHER PUBLICATIONS

Lau, T., "Building a Hypermedia Information System on the Internet," *Scaling New Heights in Technical Communication*, Banff, IPCC Proceedings, Sep. 28–Oct. 1, 1994, pp. 192–197.

Carretero, J. et al., "ParFiSys: A Parallel System for MPP," *Operating Systems Review (SIGOPS)*, 30:02, Apr. 1, 1996, pp. 74–80.

*Primary Examiner*—Moustafa M. Meky
*Attorney, Agent, or Firm*—Christensen O'Connor Johnson & Kindness PLLC

[57] ABSTRACT

A method and apparatus for accessing information on a host computer 106 from a client computer 104 utilizing an intermediate server computer 108 that is connected to the client computer by a network. The host computer transmits a presentation space data stream representing a host screen to the server computer. The server computer creates an HTML document based on the information received from the host computer and transmits the HTML document to the client computer. The client computer creates a Web page based on the HTML document. The Web page includes fields and controls that implement the functionality of the host screens while presenting an improved user interface. A user can create HTML templates that substitute for the automatically created HTML documents for any one or more of the host screens. The server computer inserts session identifiers within the URLs that are contained in the HTML documents, and uses the session identifiers to maintain separate connections between multiple host computers and a single client computer.

40 Claims, 32 Drawing Sheets

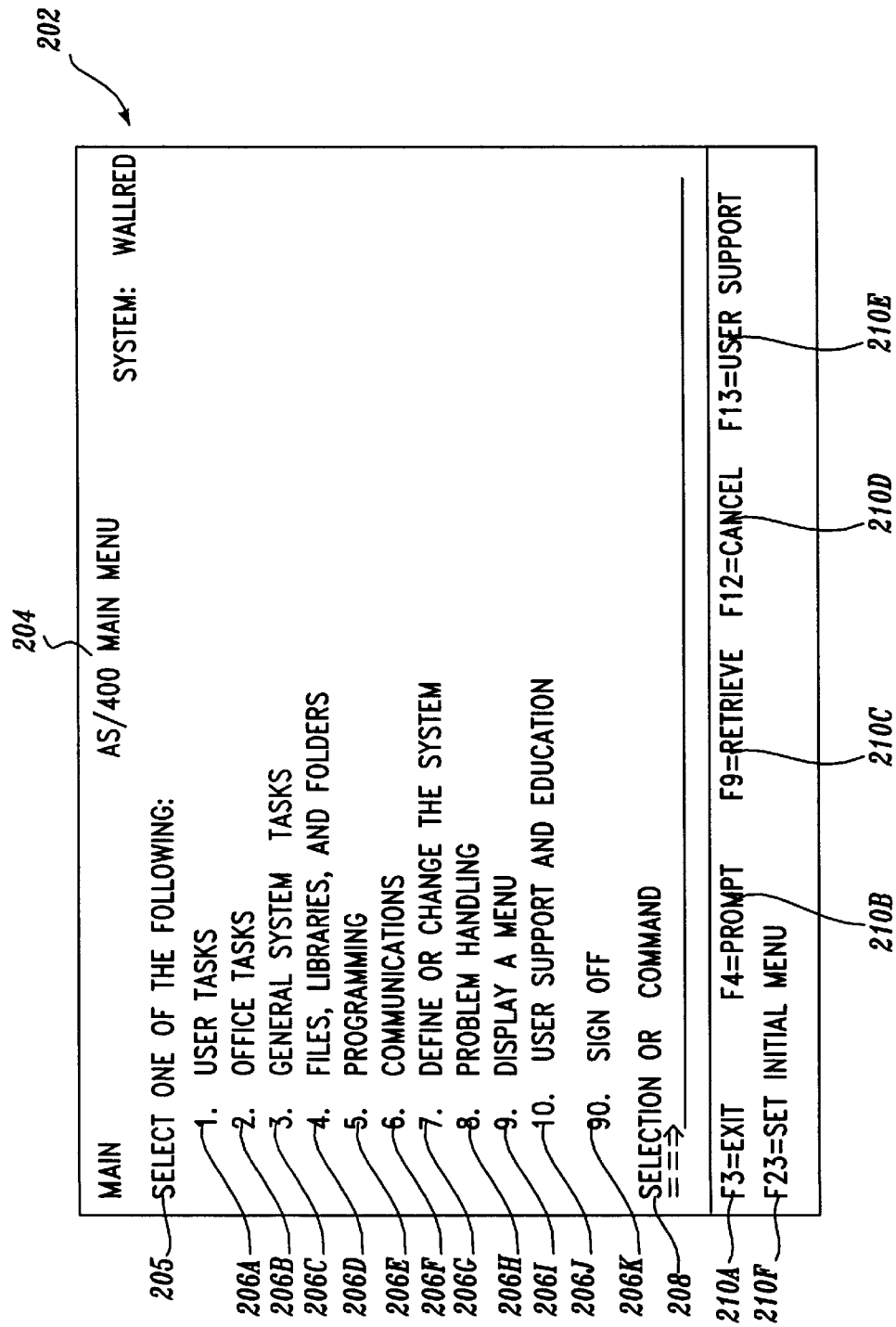

```
<HTML>
<HEAD>

<SCRIPT language=javascript>function DisplayHelp (page)
   {var path = "/Live/help/" + page; window.open (path,
   "ArpeggioLiveHelp", "toolbars=1, location=0,
   directories=0, status=1, menubar=1, scrollbars=1,
   resizable=1, copyhistory=0, width=600, height=700"); }
</SCRIPT>
</HEAD>
<META HTTP-EQUIV="REFRESH" CONTENT="180;
URL=/scripts/Liveiis.dll/Time out/34502/">

<TITLE>AS400 - AS400 - AS400 Demo</TITLE>
<BODY background=" "
onLoad+"document.forms[0].TextInputxR20xC7xLI53.focus()">

<center>
   <h2 align=center>ARPEGGIO™ Live!  Publishing
   Server</h2>
</center>

<table border=1 bgcolor="#000000">
<TR>
   <TD>
<FONT SIZE=3>
<FORM METHOD="POST"ACTION="/scripts/Liveiis.dll/
Form/34502/1307221321/277DFC/">
<pre>

<FONT COLOR="#00FFFF">MAIN</FONT>
   <FONT COLOR="#FFFFFF">AS/400 Main
   Menu</FONT>

<FONT COLOR="#00FF00">System:</FONT>
```

*Fig. 5A.*

```
<FONT COLOR="#00FFFF">Select one of the
following:</FONT>

<FONT COLOR>"00FF00> <A HREF="/scripts/Liveiis.dll/
MenuItem/34502/1/1307221321/277DFC"> <FONT COLOR=
"#00FF00">1. User tasks</FONT></a></FONT>

<FONT COLOR = #00FF00"> <A HREF="/scripts/Liveiis.dll/
MenuItem/34502/2/1307221321/277DFC"> <FONT COLOR=
"#00FF00">2. Office tasks</FONT> </a> </FONT>

<FONT COLOR="#00FF00"> <A HREF="/scripts/Liveiis.dll/
MenuItem/34502/3/1307221321/277DFC"> <FONT COLOR=
"#00FF00">3. General system tasks</FONT> </a> </FONT>

<FONT COLOR="#00FF00"> <A HREF="/scripts/Liveiis.dll/
MenuItem/34502/4/1307221321/277DFC"> <FONT COLOR=
"#00FF00">4. Files, libraries, and folders</FONT> </a>
</FONT>

<FONT COLOR="#00FF00"> <A HREF="/scripts/Liveiis.dll/
MenuItem/34502/5/1307221321/277DFC"> <FONT COLOR=
"#00FF00">5. Programming</FONT> </a> </FONT>

<FONT COLOR="#00FF00"> <A HREF="/scripts/Liveiis.dll/
MenuItem/34502/6/1307221321/277DFC"> <FONT COLOR="
#00FF00">6. Communications</FONT> </a> </FONT>

<FONT COLOR="#00FF00"> <A HREF="/scripts/Liveiis.dll/
MenuItem/34502/7/1307221321/277DFC"> <FONT COLOR=
"#00FF00">7. Define or change the system</FONT> </a>
</FONT>

<FONT COLOR="#00FF00"> <A HREF="/scripts/Liveiis.dll/
MenuItem/34502/8/1307221321/277DFC"> <FONT COLOR=
```

*Fig. 5B.*

```
<FONT COLOR="#00FF00"> <A HREF="/scripts/Liveiis.dll/
MenuItem/34502/9/1307221321/277DFC"> <FONT COLOR=
"#00FF00">9. Display a menu</FONT> </a> </FONT>

<FONT COLOR="#00FF00"> <A HREF="/scripts/Liveiis.dll/
MenuItem/34502/10/1307221321/277DFC"> <FONT COLOR=
"#00FF00">10. User support and education</FONT> </a>
</FONT>

<FONT COLOR="#00FF00"> <A HREF="/scripts/Liveiis.dll/
MenuItem/34502/90/1307221321/277DFC"> <FONT COLOR=
"#00FF00">90. Sign off</FONT> </a> </FONT>

<FONT COLOR="#00FF00"> Selection or
command</FONT>

<FONT COLOR="#00FF00"> = = => </FONT>

<INPUT TYPE="text" SIZE=73 MAXLENGTH=153 NAME=
"TextInputxR20xC7xL153" Value=' ' >

<FONT COLOR="#00FFFF"> <INPUT TYPE="submit"
NAME="F3" VALUE=' Exit'> </FONT>

<FONT COLOR="#00FFFF"> <INPUT TYPE="submit"
NAME="F4" VALUE=' Prompt'> </FONT>

<FONT COLOR="#00FFFF"> <INPUT TYPE="submit"
NAME="F9" VALUE=' Retrieve'> </FONT>

<FONT COLOR="#00FFFF"> <INPUT TYPE="submit"
NAME="F12" VALUE=' Cancel'> </FONT>

<FONT COLOR="#00FFFF"> <INPUT TYPE="submit"
```

*Fig. 5C.*

```
     <FONT COLOR="#00FFFF"> <INPUT TYPE="submit"
NAME="F23" VALUE=' Set initial menu'> </FONT>

<FONT COLOR="#FFFFFF"> (C) COPYRIGHT IBM CORP.
1980, 1989. </FONT>

</pre>

</TD>
</TR>
</TABLE>

More Keys:
   <SELECT NAME="SendKey">
   <OPTION SELECTED>Enter
   <OPTION>Attention
   <OPTION>Backspace
   <OPTION>Back Tab
   <OPTION>Clear
   <OPTION>Delete
   <OPTION>Dup
   <OPTION>End
   <OPTION>Erase EOF
   <OPTION>Erase Input
   <OPTION>Field Exit
   <OPTION>Field Minus
   <OPTION>Field Plus
   <OPTION>Home
   <OPTION>Help
   <OPTION>Print
   <OPTION>Page Up
   <OPTION>Page Down
   <OPTION>Reset
   <OPTION>System Request
```

*Fig. 5D.*

```
<OPTION>Test Request
<OPTION>F1
<OPTION>F2
<OPTION>F3
<OPTION>F4
<OPTION>F5
<OPTION>F6
<OPTION>F7
<OPTION>F8
<OPTION>F9
<OPTION>F10
<OPTION>F11
<OPTION>F12
<OPTION>F13
<OPTION>F14
<OPTION>F15
<OPTION>F16
<OPTION>F17
<OPTION>F18
<OPTION>F19
<OPTION>F20
<OPTION>F21
<OPTION>F22
<OPTION>F23
<OPTION>F24
</SELECT>
    <INPUT TYPE="submit"      VALUE=" SendKey">
    <INPUT TYPE="submit"      NAME=" SettingsButton" VALUE="Settings">
    <INPUT TYPE="submit"      NAME=" LogoffButton" VALUE="Logoff">
    <INPUT TYPE="button"      VALUE="Help"
    onclick="DisplayHelp ('UserGuide/as400/index.html')">
<HR>
<BR>
```

Fig. 5E.

```
Images/AS4_0409.Gif"><BR>
   <INPUT NAME="CtrlCheckBox" TYPE=checkbox VALUE=
"0001">CTRL
   <INPUT NAME="AltCheckBox" TYPE=checkbox VALUE=
"0002">ALT
   <INPUT NAME="ShiftCheckBox" TYPE=checkbox
VALUE="0003">SHIFT
</Form>
</FONT>
</BODY>
<div align=center> <center>

</TABLE BORDER=1 cellpadding=1>
<TR>
   <TD>
      <STRONG> Copyright © 1996. Wall Data Incorporated
      </STRONG>
   <TD>
</TR>
</TABLE>
<div> </center>
</HTML>
<HTML>
<HEAD>

<SCRIPT language=javascript>function DisplayHelp(page) {
   var path = "/alive/help/" + page;
      window.open(path, "ArpeggioLiveHelp", "toolbars=l,
location=0, directories=0, status=l, menubar=l, scrollbars=l,
resizable=l, copyhistory=0, width=600, height=700"); }
</SCRIPT>
</HEAD>
<META HTTP-EQUIV="REFRESH" CONTENT="180;
URL=/scripts/aliveiis.Dll/Timeout/60577/">
```

*Fig. 5F.*

```
<BODY background=" "
onLoad="document.forms[0].TextInputxR5xC37xL10.focus()">

<center>
   <h2 align=center>ARPEGGIO™ Live! Publishing Server</h2>
</center>

<table border=1 bgcolor="#000000">
<TR>
   <TD>
   <FONT SIZE=3>
   <FORM METHOD = "POST" ACTION="/scripts/aliveiis.Dll/Form/60577/318193112/18FD7B9/">
   <pre>
   <FONT COLOR="#FFFFFF"><STRONG>        Go to Menu (GO) </STRONG></FONT>

<FONT COLOR="#00FFFF"><STRONG>Type choices, press Enter.</STRONG></FONT>

<FONT COLOR="#00FF00">Menu . . . . . . . . . . . . . . .
</FONT>

<INPUT TYPE="text" SIZE=10 MAXLENGTH=10 NAME="TextInputxR5xC37xL10" Value="">

<FONT COLOR="#00FF00">Name, generic*, *ALL </FONT>

<FONT COLOR="#00FF00"> Library . . . . . . . . . . . </FONT>

<INPUT TYPE="text" SIZE=10 MAXLENGTH=10 NAME="TextInputxR6xC39xL10" Value="*LIBL">

<FONT COLOR="#00FF00">Name, *LIBL, *CURLIB <INPUT
```

*Fig. 5G.*

```
"></FONT>

<FONT COLOR="#00FF00">Return point . . . . . . . . . .
</FONT>

<INPUT TYPE="text" SIZE=4 MAXLENGTH=4 NAME=
"TextInputxR7xC37xL4" Value="*YES">

<FONT COLOR="#00FF00">*YES, *NO </FONT>

<FONT COLOR="#FFFFFF"><STRONG><A HREF=
"/scripts/aliveiis.Dll/SendKey/60577/Page+Up/318193112/
18FD7B9">

<FONT COLOR="#FFFFFF">Up</FONT></a></STRONG>
</FONT>

<FONT COLOR="#00FFFF"><STRONG><INPUT TYPE=
"submit" NAME="F3" VALUE="Exit">
   <INPUT TYPE="submit" NAME="F4" VALUE="Prompt">
   <INPUT TYPE="submit" NAME="F5" VALUE="Refresh">
   <INPUT TYPE="submit" NAME="F12" VALUE="Cancel">
   <INPUT TYPE="submit" NAME="F13" VALUE="How to use
this display">
   <INPUT TYPE="submit" NAME="" VALUE="More keys">
</STRONG></FONT>
</pre>
   </TD>
</TR>
</TABLE>

More Keys:
   <SELECT NAME="SendKey">
   <OPTION SELECTED>Enter
   <OPTION>Attention
```

*Fig. 5H.*

```
"></FONT>

<FONT COLOR="#00FF00">Return point . . . . . . . . . .
</FONT>

<INPUT TYPE="text" SIZE=4 MAXLENGTH=4 NAME=
"TextInputxR7xC37xL4" Value="*YES">

<FONT COLOR="#00FF00">*YES, *NO </FONT>

<FONT COLOR="#FFFFFF"><STRONG><A HREF=
"/scripts/aliveiis.Dll/SendKey/60577/Page+Up/318193112/
18FD7B9">

<FONT COLOR="#FFFFFF">Up</FONT></a></STRONG>
</FONT>

<FONT COLOR="#00FFFF"><STRONG><INPUT TYPE=
"submit" NAME="F3" VALUE="Exit">
   <INPUT TYPE="submit" NAME="F4" VALUE="Prompt">
   <INPUT TYPE="submit" NAME="F5" VALUE="Refresh">
   <INPUT TYPE="submit" NAME="F12" VALUE="Cancel">
   <INPUT TYPE="submit" NAME="F13" VALUE="How to use
this display">
   <INPUT TYPE="submit" NAME="" VALUE="More keys">
</STRONG></FONT>
</pre>
   </TD>
</TR>
</TABLE>

More Keys:
   <SELECT NAME="SendKey">
   <OPTION SELECTED>Enter
   <OPTION>Attention
```

*Fig. 5J.*

```
<OPTION>Back Tab
<OPTION>Clear
<OPTION>Delete
<OPTION>Dup
<OPTION>End
<OPTION>Erase EOF
<OPTION>Erase Input
<OPTION>Field Exit
<OPTION>Field Minus
<OPTION>Field Plus
<OPTION>Home
<OPTION>Help
<OPTION>Print
<OPTION>Page Up
<OPTION>Page Down
<OPTION>Reset
<OPTION>System Request
<OPTION>Tab
<OPTION>Test Request
<OPTION>F1
<OPTION>F2
<OPTION>F3
<OPTION>F4
<OPTION>F5
<OPTION>F6
<OPTION>F7
<OPTION>FB
<OPTION>F9
<OPTION>F10
<OPTION>F11
<OPTION>F12
<OPTION>F13
<OPTION>F14
<OPTION>F15
<OPTION>F16
```

Fig. 5J.

```
</TABLE>
<div> </center>
</BODY>
</HTML>
```

*Fig. 5K.*

```
<HTML>
<HEAD>
<SCRIPT language=javascript>function DisplayHelp(page) {
var path = "/alive/help/" + page ;
window.open(path,"ArpeggioLiveHelp","toolbars=1,location=0,d
irectories=0,status=1,menubar=1,scrollbars=1,resizable=1,cop
yhistory=0,width=600,height=700");
}
</SCRIPT></HEAD>
<META HTTP-EQUIV="REFRESH" CONTENT="180;
URL=/scripts/aliveiis.Dll/Timeout/60577/">
<TITLE>AS400 - AS400 Demo</TITLE>
<BODY background=" "
onLoad="document.forms[0].TextInputxR5xC37xL10.focus()">
<center>
<h2 align=center>ARPEGGIO™ Live! Publishing
Server</h2>
</center>

<table border=1 bgcolor="#000000">
<TR><TD>

<FONT SIZE=3>
<FORM METHOD = "POST"
ACTION="/scripts/aliveiis.Dll/Form/60577/318193112/18FD7B9
/">
<pre>          <FONT COLOR="#FFFFFF"><STRONG>
Go to Menu (GO)        </STRONG></FONT>
 <FONT COLOR="#00FFFF"><STRONG>Type choices, press
Enter.</STRONG></FONT>
  <FONT COLOR="#00FF00">Menu . . . . . . . . . . . . . .</FONT>
<INPUT TYPE="text" SIZE=10 MAXLENGTH=10
NAME="TextInputxR5xC37xL10" Value="">   <FONT
COLOR="#00FF00">Name, generic*, *ALL
```

*Fig. 11A.*

```
</FONT> <FONT COLOR="#00FF00"> Library . . . . . . . . . .
.</FONT>    <INPUT TYPE="text" SIZE=10 MAXLENGTH=10
NAME="TextInputxR6xC39xL10" Value="*LIBL"> <FONT
COLOR="#00FF00">Name, *LIBL, *CURLIB <INPUT
TYPE="submit" NAME="PROMPTxR6xC39xL10" VALUE=" ...
"></FONT>
 <FONT COLOR="#00FF00">Return point . . . . . . . . .
 </FONT>   <INPUT TYPE="text" SIZE=4 MAXLENGTH=4
NAME="TextInputxR7xC37xL4" Value="*YES">      <FONT
COLOR="#00FF00">*YES, *NO
</FONT>
                                            <FONT
COLOR="#FFFFFF"><STRONG><A HREF =
"/scripts/aliveiis.Dll/SendKey/60577/Page+Up/318193112/18F
D7B9"><FONT
COLOR="#FFFFFF">Up</FONT></a></STRONG></FONT>
 <FONT COLOR="#00FFFF"><STRONG><INPUT
TYPE="submit" NAME="F3" VALUE="Exit">  <INPUT
TYPE="submit" NAME="F4" VALUE="Prompt">  <INPUT
TYPE="submit" NAME="F5" VALUE="Refresh">  <INPUT
TYPE="submit" NAME="F12" VALUE="Cancel">  <INPUT
TYPE="submit" NAME="F13" VALUE="How to use this
display">   <INPUT TYPE="submit" NAME="" VALUE="More
keys"></STRONG></FONT>
</pre>
</TD>
</TR>
</TABLE>
More Keys:
<SELECT NAME="SendKey">
<OPTION
SELECTED>Enter<OPTION>Attention<OPTION>Backspace<
OPTION>Back
Tab<OPTION>Clear<OPTION>Delete<OPTION>Dup<OPTIO
N>End
```

*Fig. 11B.*

```
    <OPTION>F18
    <OPTION>F19
    <OPTION>F20
    <OPTION>F21
    <OPTION>F22
    <OPTION>F23
    <OPTION>F24
</SELECT>
    <INPUT TYPE="submit" VALUE="SendKey">
    <INPUT TYPE="submit" NAME="Settings" VALUE=
"Settings">
    <INPUT TYPE="submit" NAME="Logoff" VALUE= "Logoff">
    <INPUT TYPE="button" VALUE="Help" onclick=
"DisplayHelp('UserGuide/as400/index.html')">

<HR><BR>

<INPUT TYPE="image" NAME="KeyMap" SRC="/Alive/
Images/HostKeymap.Gif"><BR>
    <INPUT NAME="CTRL" TYPE=checkbox VALUE="0001">
CTRL
    <INPUT NAME="ALT" TYPE=checkbox VALUE="0002">
ALT
    <INPUT NAME="SHIFT" TYPE=checkbox VALUE=
"0003">SHIFT
</Form>

</FONT>

</TABLE BORDER=1 cellpadding=1>
<TR>
  <TD>
     <STRONG> Copyright © 1996.  Wall Data Incorporated
     </STRONG>
  <TD>
```

*Fig. 11C.*

```
            <STRONG> Copyright © 1996, Wall Data
Incorporated </STRONG>
        </TD>
     </TR>
</TABLE>
</div></center>
</HTML>
```

*Fig. 11D.*

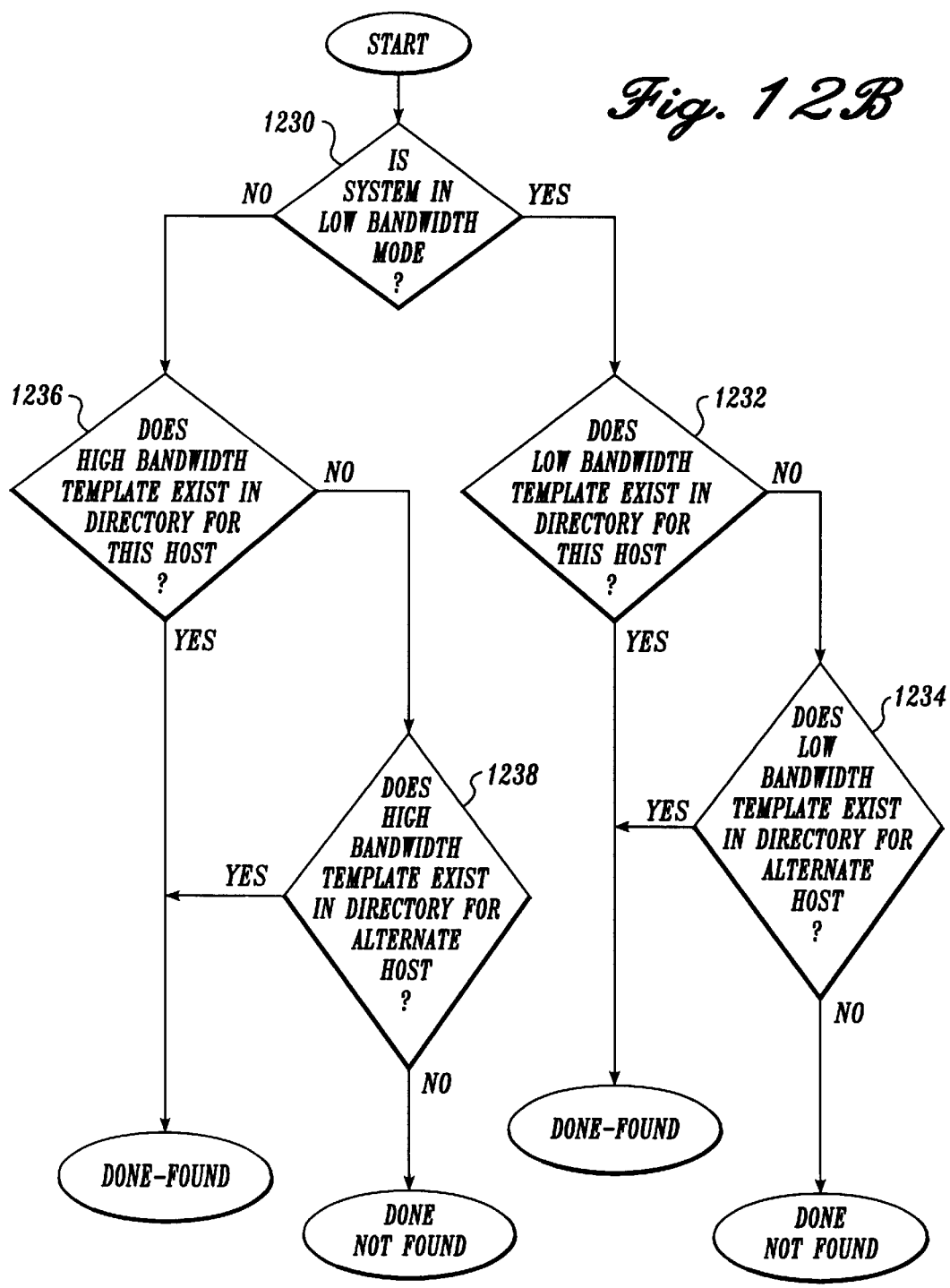

METHOD OF ACCESSING INFORMATION ON A HOST COMPUTER FROM A CLIENT COMPUTER

CROSS-REFERENCE

This application is a continuation of U.S. patent application No. 08/762,266, filed Dec. 9, 1996, now U.S. Pat. No. 5,968,119, priority from the filing date of which is hereby claimed under 35 U.S.C. § 120.

FIELD OF THE INVENTION

The present invention relates to methods of accessing information on a host computer from a client computer, and in particular, methods of communicating between a client computer connected to a network and a host computer that is accessible through the network.

BACKGROUND OF THE INVENTION

Many businesses utilize mainframe or minicomputers such as IBM mainframes, the Hewlett Packard HP3000, the IBM AS/400, and Digital Equipment Corporation VAX computers to maintain and manipulate essential information, such as accounting data. At one time, access to the programs, and therefore the data, was available only through dedicated terminals, which were connected directly to the computer or to a network on which the computers resided. However, as the use of personal computers in businesses became widespread, terminal emulation programs were developed that ran on personal computers. A terminal emulation program allows a personal computer (PC) to function as a terminal to a host mainframe or minicomputer. The PC monitor displays the information that a dedicated host terminal would display, while alphanumeric data entered with the PC is passed to the host computer in the same manner as if the data were entered with a dedicated terminal.

The RUMBA® connectivity software, developed by Wall Data Incorporated, is a computer program that establishes a communications link between a PC and a host computer. The RUMBA software allows the user of a PC to connect to a host computer in order to view stored data and enter new data. RUMBA provides a window on the PC within which an operator can access and manipulate data from a host computer. The communications link and window are referred to as a RUMBA session. The host computer creates a memory buffer containing data that is displayed on the host terminal, if such a terminal is used. The visual representation of the host memory buffer is referred to as a presentation space, and is displayed within a RUMBA window that can be manipulated utilizing standard Windows techniques, such as resizing or moving the window.

In recent years, there has been a tremendous proliferation of computers connected to a global network known as the Internet. A computer connected to the Internet can download digital information from special computers connected to the Internet called World Wide Web servers. These servers allow other computers to execute a Web browser program that translates the digital information into a visual form that is perceptible by a user.

Documents that can be retrieved from a computer on the Internet generally containing instructions in a format known as "Hypertext Markup Language" (HTML). These instructions allow a computer that is running a Web browser to view the document. HTML includes instructions for formatting text, linking to digital data, and receiving input from a user at a client computer. HTML is designed to be platform independent, so a Web page can be displayed on any computer with a compatible browser program.

The Web server transmits an HTML document over the Internet to client computers. Typically, a Web server includes multiple HTML documents, each page being stored in a file on the Web server's disk or other storage mechanism.

In addition to the Internet, another computer configuration that is becoming increasingly popular is called an "intranet." An intranet operates in the same manner as the Internet, except that client computers and servers are connected together through a local area network (LAN), which allows limited access from computers that are not coupled directly to the LAN. Typically, an intranet is used within a single corporation or other organization.

Markup languages, such as HTML, provide limited capabilities. Unlike regular programming languages, markup languages are designed to specify the formatting information necessary to present information. They do not have the dynamic capabilities of a regular programming language. JavaScript is a scripting language that is used to extend the capabilities of HTML. JavaScript is capable of recognizing and responding to events, such as mouse clicks and movements, generated by a browser program. JavaScript scripts are embedded in HTML documents. The browser executes each script as it reaches the position of the script during interpretation of the HTML document. JavaScript scripts are transferred between a server and a browser as text and interpreted by the browser program.

Currently existing methods of accessing information from host computers require the time and expense of physically linking client computers with host computers. It is desirable to have a method of providing access to host computers from remote locations. It is also desirable that such a method provide a user interface that is easy to use.

SUMMARY OF THE INVENTION

The present invention is a method of transferring information between a host computer and a client computer that are connected together through a server computer. The invention provides a Display control object, a host extension object, and a server application framework. The Display control object functions as a "virtual" host, by receiving information from the host computer, sending information to the host extension, and sending commands and information back to the host computer. The host extension receives information from the host computer via the Display control, and creates a set of instructions that is transferred, via the server application framework, to the client computer. The client computer utilizes the set of instructions received from the host extension to create Web pages that are displayed on the client computer. A user interacts with the client computer, sending commands to the host extension, and receiving new Web pages. In a currently preferred architecture, the client computer is linked to the server computer by the Internet, or a local area network, the server computer is linked to the host computer by an SNA network, and the host computer sends data to the server computer in a PS data stream.

The server computer receives data from the host computer that represents a host computer display screen having function key capable fields and an associated partial list of items. Upon receipt of this data from the host computer, the server computer locates the function key capable fields, and creates a set of instructions including statements in HTML that corresponds to the function key capable fields. The instructions are sent to the client computer. The client computer is programmed to continually scan the user's input for the presence of a function key, which in the presently preferred embodiment of the invention is the F4 key. When the user enters the F4 key, the server computer receives a request from the client computer for a complete list of items corresponding to the function key capable field, whereupon the server computer receives additional data, and transmits this additional data to the client computer.

The invention also includes a process of determining whether a pre-existing instruction template corresponding to a host computer screen exists, and, if it does, sending the pre-existing instruction template to the client computer instead of creating a new set of instructions. Preferably, a session ID corresponding to each instruction template is used to determine if the instruction template corresponds to the host computer screen. By determining a screen ID for the host computer screen and testing whether the screen ID for the host computer screen corresponds to any of the existing instruction templates the host computer is able to determine whether the pre-existing template exists. An instruction template may further include a pull data field that specifies information is desired from the host computer. When the server computer finds a pull data field, the information is retrieved, and inserted in the instruction template in place of the pull data field.

The invention further includes a method of maintaining parallel sets of instruction templates, one set corresponding to client computers operating in a low bandwidth mode and a second set corresponding to client computers operating in a high bandwidth mode. When the server computer determines that the client computer is operating in a low bandwidth mode, the server computer retrieves an instruction template from the low bandwidth set. When the server computer determines that the client computer is operating in a high bandwidth mode, the server computer retrieves an instruction template from the high bandwidth set.

The invention also provides for multiple communication sessions, each communication session having one browser application, one host extension object, one Display control, and one host computer. A session ID is associated with each communication session. The session ID is inserted in the Hypertext Link Addresses that are sent from the server computer to the client computer. When the server computer receives a Hypertext Link Address from the client computer, the session ID is extracted and used to identify the particular host extension that corresponds to the originating browser application. The command is then forwarded to the particular corresponding host extension.

The invention also includes a method of determining the focus field in a host computer screen, the focus field being the field that currently contains a cursor. The information is used to determine a corresponding cursor field on the Web page that is created from the host screen. Instructions are included in the set of instructions that are sent to the client computer, the instructions positioning a cursor in the correct cursor field on the Web page displayed on the client computer.

As will be readily appreciated from the foregoing description, the computer based system and method enables an organization to provide easy access to host applications over a local area network, or publish applications to users over a global network. By allowing a host application to be accessed by anyone on an existing global network, the invention provides ease of accessibility without requiring the expense of a proprietary network. The invention further provides an improved user interface to existing host applications, improving efficiency and ease of use.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2A to 2C are pictorial representations of information that is received from a host computer and a corresponding exemplary net browser application window displaying Web pages having the host information contained therein;

FIGS. 5A to 5K illustrate exemplary HTML instructions to create controls for function key and menu item fields;

FIGS. 11A and 11D illustrate a portion of an exemplary HTML document implementing an ellipsis button control in a Web page;

FIGS. 12A and 12B are flow diagrams illustrating the process of determining whether a new host screen corresponds to an existing HTML template, and creating a Web page accordingly;

DETAILED DESCRIPTION OF THE PREFERRED EMBODIMENT

Figure 1A:
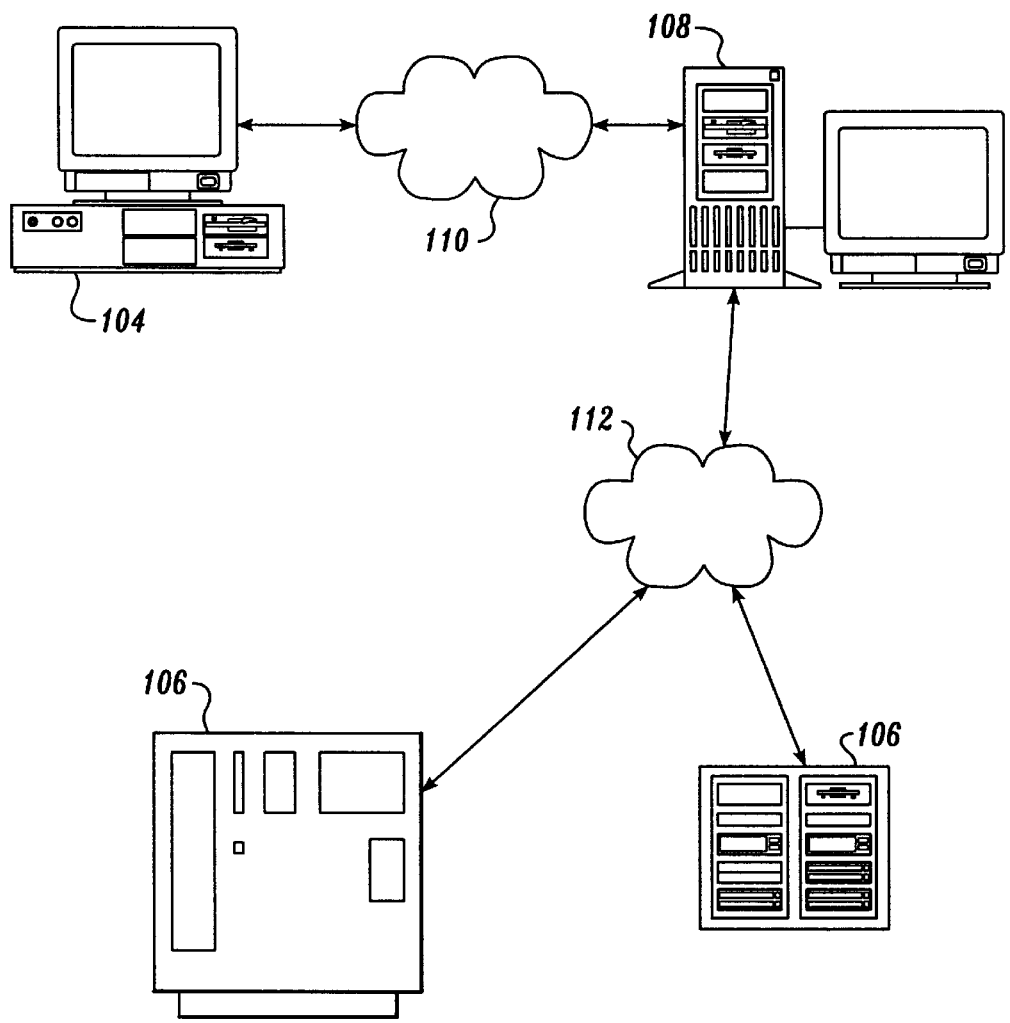
FIGS. 1A and 1B are block diagrams illustrating an exemplary networking architecture in which the invention is used.

FIG. 1A illustrates an exemplary architecture 102 in which one or more client computers 104 communicate with one or more host computers 106 via a network. Each client computer is preferably a personal computer of the type that includes an amount of volatile memory, and nonvolatile memory such as a hard disk or other storage device. In addition, each client computer 104 includes a processor, a keyboard, a directional input device such as a mouse, and a display device such as a cathode ray tube (CRT) or a liquid crystal display (LCD). As will be readily understood by one skilled in this art, and others, a number of different directional input devices exist that are functional for allowing a user to provide directional input to a computer and select items displayed on a computer display. The most popular devices are mice, trackballs, touch pads, and joysticks. Keys on a keyboard may also be used to provide directional input and select graphical items. However, for purposes of discussion, the description of the input devices shall primarily concentrate on mice.

The host computer 106 can be an IBM AS/400 computer, an IBM mainframe or other similar computer. A server computer 108 is topologically intermediate the client computer 104 and the host computers 106. The server computer 108 is preferably a personal computer having the elements of a client computer 104 as described above. The client computer 104 and the server computer 108 communicate with each other via a communication medium 110, such as a wide area network, a local area network, intranet, or TCP/IP. The preferred communication medium 110 is the Internet. The Internet is a widely used wide area network that comprises many networks linked together to form a global network. The Internet, local area networks, and TCP/IP communication mediums are well understood in the art and need not be discussed in further detail here. Connection to the Internet is provided by numerous commercial services. Description of the invention using the Internet as the communication medium 110 should be considered exemplary, and not limiting.

The server computer 108 and the host computers 106 are connected by a communication medium 112 that may be a direct link or a network, enabling the server computer 108 and the host computers 106 to communicate by sending or receiving commands and data. In the currently preferred embodiment of the invention, the communication medium 112 is a network having an architecture referred to as a System Network Architecture (SNA). An SNA network may optionally employ an SNA server (not shown), which functions as an intermediary between the communications medium 112 and each host computer 106.

The SNA utilizes a set of standards developed by IBM for network communication. The communication standards are considered to be well known to those skilled in the art and need not be discussed in further detail except as they relate to the present invention.

The host computer 106 sends packets of data, referred to as data streams, across the communication medium 112 to the server computer 108. Every data stream is preceded by header information containing flags or indicators representing network status and other information. The header information is used by nodes on the network to coordinate the exchange of data between nodes.

Figure 1B:
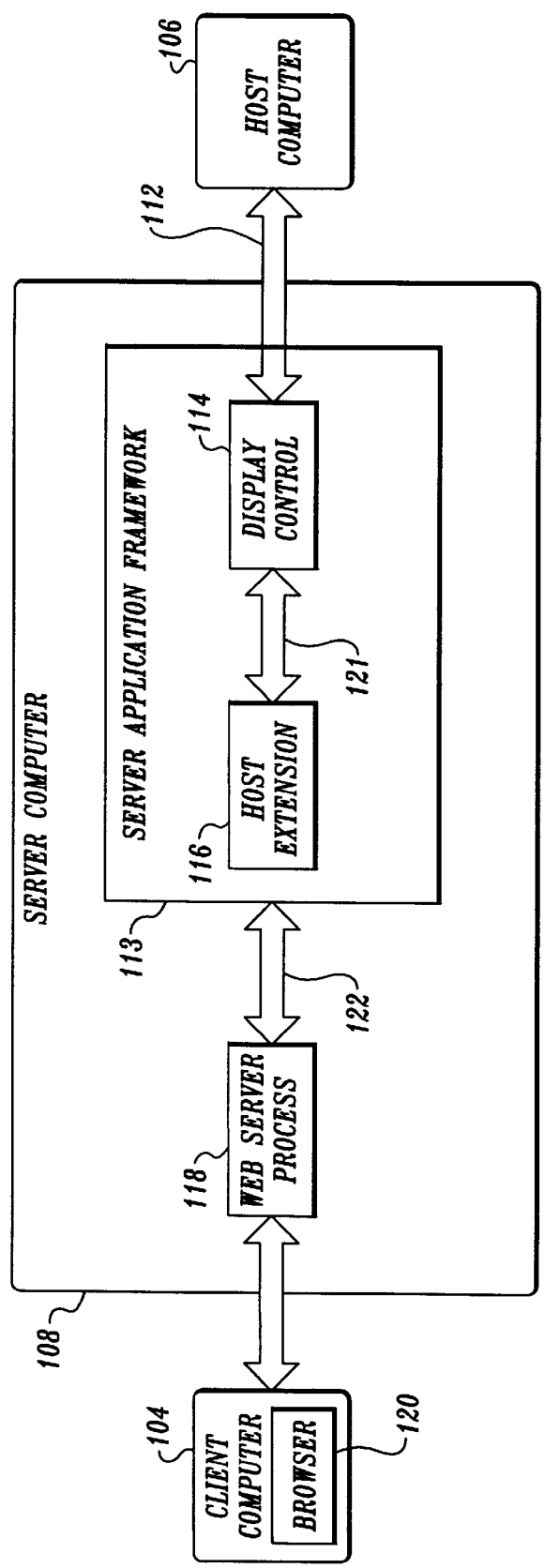

FIG. 1B illustrates a preferred architecture of the present invention. The server computer 108 includes a Web server 118 application that is run by the server computer to send and receive data from the Internet and a server application framework 113. The server application framework includes a Display control 114 and a host extension object 116. The Display control 114 serves as an intermediary between a corresponding host computer 106 and a corresponding host extension object 116. Data and commands are sent between the Display control 114 and the host computer 106 over the communications medium 112 and between the Display control and the host extension via a bidirectional data path 121.

The Display control 114 functions as a "virtual" host computer to the host extension 116, preferably providing an object oriented framework and communication means, while hiding some of the communication details from the host extension 116. A Display control 114 is disclosed in a copending application entitled "Method for Accessing Information on a Host Computer from a Client Computer," Ser. No. 08/746,782, filed on Nov. 15, 1996, the subject matter of which is incorporated herein by reference.

Each host computer 106 has a conceptual two-dimensional display, called a presentation space (PS), and an associated PS buffer. The PS buffer is a region in the host computer's memory containing information that can be displayed in a computer screen. A presentation space is the conceptual display that would be created if the entire PS buffer were displayed on the computer screen. A PS buffer includes one or more fields that contain data, such as a text string or a numeric value. When a PS buffer is transmitted over the communications medium 112, it is referred to as a PS data stream. The complete format of a PS data stream is documented in *Data Stream Programmer's Reference*, GA23-0059-07, by IBM Corp. (1987). The content and format of a PS data stream are well known to those skilled in this art, and need not be discussed in further detail except as they relate to the present invention.

The Display control 114 stores the information, including the data pertaining to each field, received from the host computer 106. The field data includes such data as the field text, the length of the field, and whether a field is protected or not. The field text is the text displayed on the host screen. A protected field cannot be modified directly by a user. In the preferred embodiment, the Display control retrieves the field text and stores it in an object corresponding to the particular field. The Display control provides an object oriented interface that allows the host extension 116 to access the information, and to send data and commands back to the host computer 106 via the Display control 114.

When the Display control 114 receives a new PS data stream, it sends an event to the host extension 116, thereby notifying the host extension of the newly received PS data stream. The host extension 116 then queries the Display control 114 for information pertaining to the PS data stream. As described in further detail below, the host extension utilizes the obtained information to create a document containing instructions that can be used to display a Web page. In the preferred embodiment, the document is comprised of HTML statements and embedded scripts, and is referred to as an HTML document. The HTML document is transferred via a data path 122 to the Web server process 118.

The Web server process 118 receives HTML documents and transmits the HTML documents over the Internet to the client computers 104. A number of Web server processes 118 are commercially available, such as Microsoft Internet Information Server by Microsoft Corporation and Netscape Communications Server by Netscape Corporation.

The client computer 104 includes a Web browser application 120, that displays HTML documents received from the server computer 108. The Web browser application 120 may comprise a single application, or multiple applications working together to implement the functionality of the Web browser 120. Netscape Navigator™ 3.0, by Netscape Communications Corporation, of Mountain View, Calif., and Internet Explorers™, by Microsoft Corporation, of Redmond, Wash., are two examples of Web browser applications 120 that can be used with the present invention when running on the Windows 3.1®, Windows 95®, or Windows NT® operating systems.

The server application framework 113 serves as a container for the host extension object 116 and the Display control 114. The Web server process 118 sends commands and data to the host extension through the server application framework. As will be discussed in farther detail below, when more than one host extension is active on the server computer, the server application framework handles routing, so that commands coming from the Web server process are directed to the correct host extension. Similarly, communication from a host extension to the Web server process are routed through the server application framework.

In a preferred means of communication, the server application framework includes a software process, such as a dynamically linked library (not shown), that functions as an intermediary between the Web server process 118 and the host extension 116. The software process communicates with the host extension using a standard interface technique known as object linking and embedding (OLE), and specifically OLE automation. The software process makes a remote procedure call to the host extension 116 to request and receive information from the host extension. OLE and remote procedure calls are well understood in this art, and need not be discussed in further detail here.

The Web browser 120, upon receiving a new HTML document over the Internet, interprets the HTML statements and any embedded scripts, and displays a Web page. The Web page contains information that was transmitted by the host computer 106 over the communications medium 112 in a PS data stream. A user viewing the Web page at the client computer 104 can input commands or data. The commands or data follow a reverse path to the host computer 106. That is, the commands or data are transmitted from the client computer 104 over the Internet to the Web server process 118. The Web server process 118 passes the commands or data, through the server application framework, to the host extension 116, which communicates the commands or data to the Display control 114 over the data path 121. The Display control 114 transmits the commands or data over the communications medium 112 to the host computer 106. Below are descriptions of the translations that occur, primarily within the host extension 116, as commands and data are transferred between the host computer 106 and client computer 104.

Figure 2B:
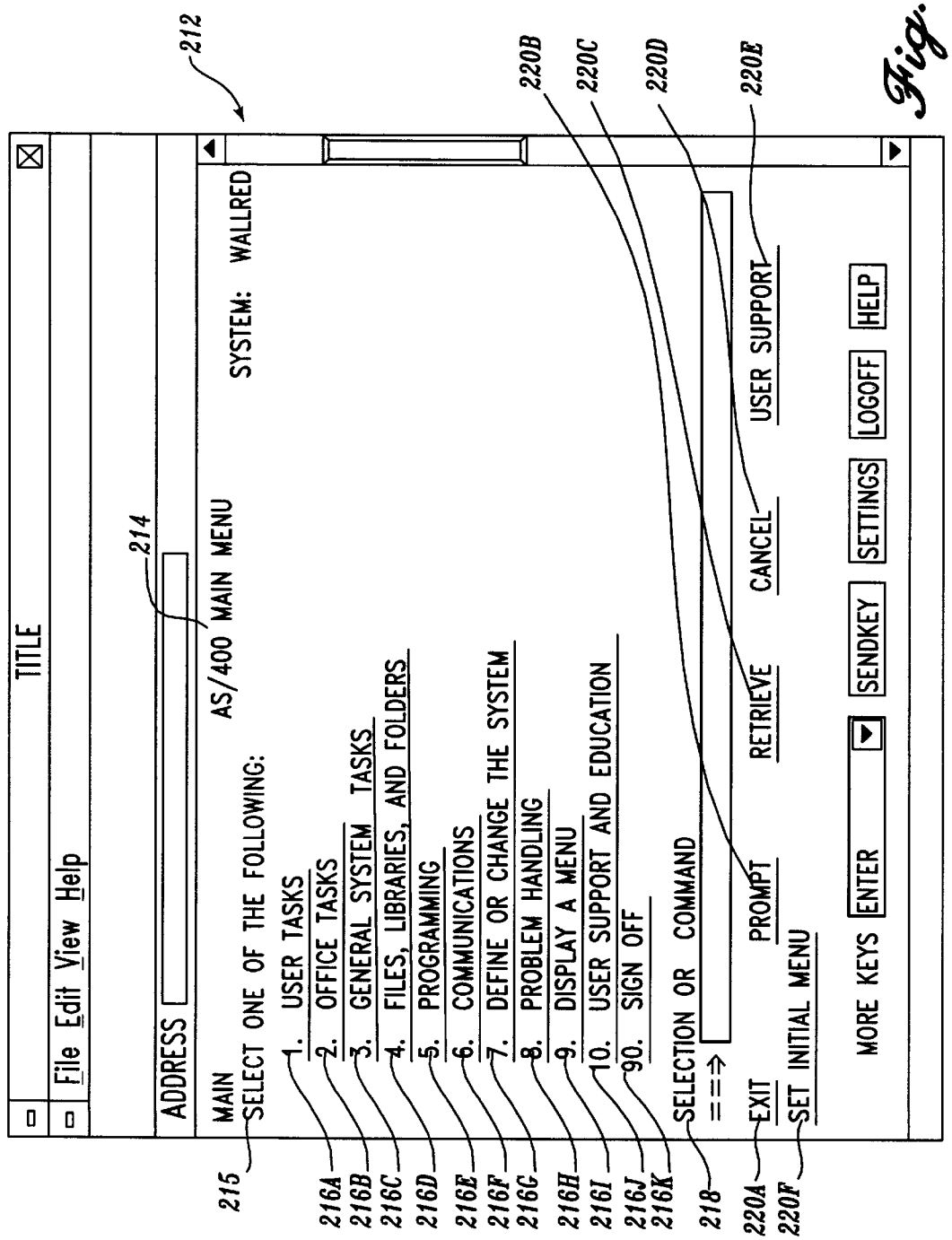

FIG. 2A illustrates an exemplary host computer screen 202 or presentation space. FIG. 2B illustrates a corresponding Web page 212 as displayed on a client computer. As discussed above, the contents of the PS data stream representing the host computer screen 202 are analyzed, and an HTML document 224 is created. The HTML document, when displayed by the Web browser application running on the client computer 104 appears as the Web page 212.

The exemplary host screen 202 includes a title 204 and static text 205. A plurality of menu items 206a–k presents a choice of selections to a user. An edit box 208 provides a user operating a terminal at the host computer with an area in which to enter a number corresponding to one of the menu items 206a–k. When a user at a host terminal selects one of the menu items 206a–k, the host presents a new screen corresponding to the selected menu item.

The host screen 202 also includes a menu of function keys 210a–f along the bottom of the screen. The function keys represent actions that a user can take as an alternative to selecting one of the menu options 206a–k. For example, the function key, F3, represents an EXIT command that allows a user to exit the host application. A function key, F12, corresponds to a CANCEL command that allows a user to cancel the previous selection. Each host screen has a set of one or more function key commands that are along the bottom of the screen.

The Web page 212 corresponding to the host screen 202 includes items corresponding to the items within the host screen. At the top of the page is a title 214, corresponding to the host screen title 204, that informs a viewer what screen they are seeing. Below the title is a static text message 215, corresponding to the host screen static text 205, that informs the viewer of the functions that may be performed. For example, the static text shown asks the viewer to "select one of the following" and is followed by a set of menu items 206a–k that can be activated as described below. A set of menu items 216a–k correspond to the host screen menu items 206a–k. A selection edit box 218 corresponds to the host edit box 208. A set of menu items 220a–f correspond to the host screen function key menu items 210a–f.

The appearance and operational capabilities of the menu items 216a–k are different from the corresponding host screen menu items 206a–k. Specifically, the Web page menu items 216a–k are hypertext links implemented by using HTML instructions. HTML provides the ability to include a hypertext link within a Web page. A hypertext link, also referred to as a hyperlink, is defined with text and a specification of a location of a new Web page or a position within the same Web page. The specification of the location of a Web page is referred to as a Universal Resource Locator (URL). When a user places the cursor over a hyperlink and clicks to select the link, a new Web page is retrieved, or the position in the current Web page is changed to the specified location. Hyperlinks are typically displayed in a color different from the color of ordinary text, and are underlined, although commercial Web browsers allow a user to change the appearance of hyperlinks. In FIG. 2B each of the menu items 216a–k are underlined to indicate that they represent hypertext links.

A user desiring to select one of the menu items 216a–k does not need to enter the corresponding item number in the edit box 218. Rather, a user places the cursor over one of the hypertext menu items 216a–k and clicks on the mouse button or other input device. Upon receiving an input click on a hyperlink, the Web browser sends the associated address, or URL, to the Web server process 118. The Web server process forwards the URL to the server application framework, which then routes the URL to a host extension. The host extension, in response to receiving a URL from a Web browser, retrieves additional information and sends a new HTML document back to the originating Web browser. As discussed in further detail below, the retrieval of additional information may include sending a command or query to the Display control 114, which may send a corresponding command to the host computer 106.

The Web page in FIG. 2B also includes a set of hyperlinks 220a–f that represent to the function key items 210a–f on the host screen 202. Each of the hypertext links 220a–f presents to a user the ability to perform the equivalent operation of the corresponding function key item 210a–f. However, instead of pressing a function key on the keyboard, a user can select the item by moving the cursor over the item and clicking a button on the mouse or other input device. As discussed above with regard to the menu items 216a–k, upon selecting one of the hyperlinks 220a–f, a command, in the form of a URL, is sent from the Web browser application 120 to the server process 118, where the command is processed. Although to a user, both the hyperlink menu items 216a–k and the hyperlink function key items 220a–f appear similar, each has different meanings. The hyperlink menu items 216a–k represent selections from a choice of items, while the hyperlink function key items 220a–f represent commands that are executed upon selection, which may or may not result in a transfer to a new screen. As will be discussed in further detail below, the implementation of the two types of hyperlinks also differ.

Figure 2C:
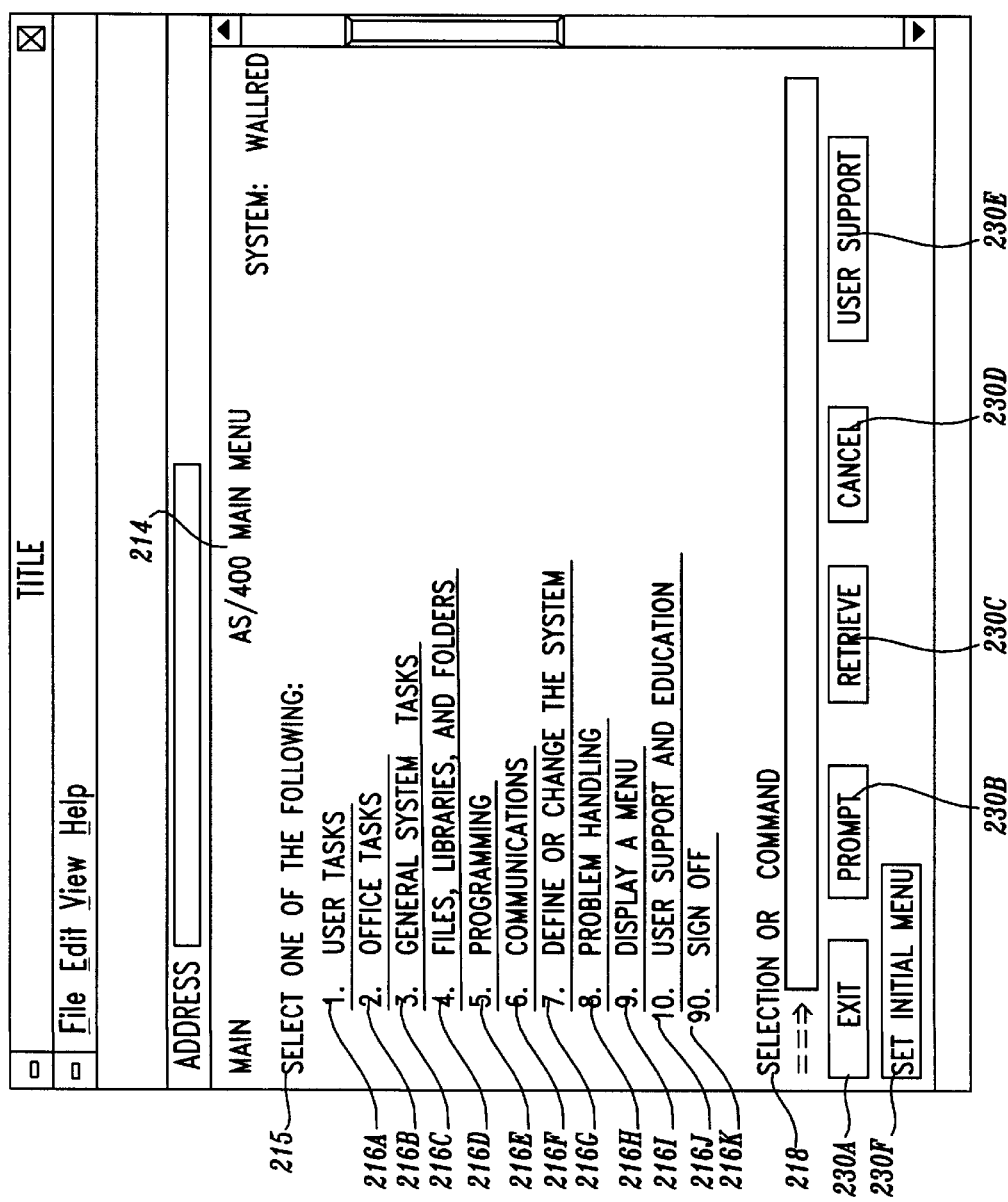

FIG. 2C illustrates an alternative embodiment of the Web page illustrated in FIG. 2B. As depicted in FIG. 2C, the Web page 228 includes a row of buttons 230a–f corresponding to the hyperlink function keys 220a–f of FIG. 2B. The function key buttons 230a–f are functionally similar to the hyperlink function keys 220a–f. When the user selects one of the function key buttons 230a–f, the Web browser application sends a command to the Web server process, which then forwards the command to the host extension for processing. Preferably, the invention includes both of the embodiments illustrated in FIGS. 2B and 2C, and presents to the user a choice of which embodiment to use.

Figure 3:
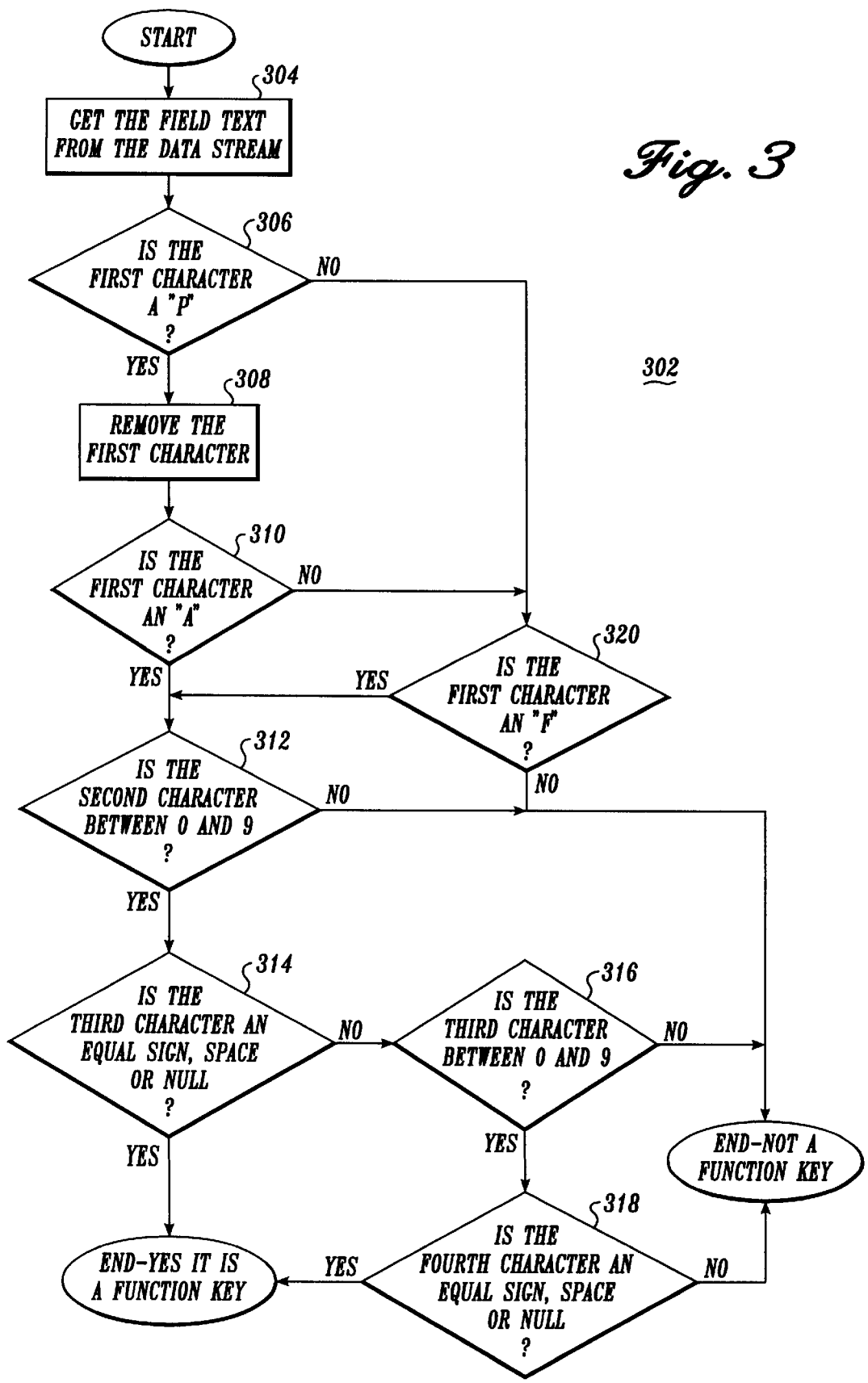
FIG. 3 is a flow diagram illustrating the process of parsing text to determine whether the corresponding field is a function key field.

FIG. 3 illustrates a series of steps 302 of locating a function key field, as performed by the host extension 116 in order to create a corresponding hyperlink or button. Beginning with a step 304, the host extension retrieves a field text, from a PS data stream transmitted from the host computer. Preferably, the host extension retrieves the field text by querying the Display control and saving a local copy of the text. At a step 306, the host extension examines the first character of the text to determine if it is a 'P'. If the first character is a 'P', then at a step 308, the host extension removes the first character from its local copy of the text. At a step 310, the host extension determines if the new first character is an 'A'.

If, at the step 310, the host extension determines that the new first character is an 'A'", the host extension determines whether the second character is a decimal digit, that is, a digit between 0 and 9 inclusive at a step 312. If the second character is not a decimal digit, a function key is not found and the process terminates with respect to the current field text. If, at the step 312, it is determined that the second character is a decimal digit, then at a step 314, a determination is made of whether the third character is an equal sign, ("="), a SPACE, or a NULL character. If, at the step 314, an equal sign, SPACE, or NULL is found, the process terminates, and the host extension declares that a function key has been found.

If, at the step 314, one of the three desired characters, i.e., the equal sign, space or NULL characters are not found, the host extension determines whether the third character is a decimal digit at a step 316. If the determination at step 316 is negative, the host extension declares that a function key is not found and the process terminates with respect to the current field text. If, at the step 316, the third character is determined to be a decimal digit, then the host extension determines whether the fourth character is an "=" sign, a space, or a NULL character at step 318. If the answer to step 318 is yes, the host extension declares that a function key has been found and the process terminates with respect to the current field text. If, the answer to the step 318 is no, the host extension declares that a function key has not been found and the process terminates with respect to the current field.

If, at the step 306, the first character is not a 'P', the host extension determines whether the first character is an 'F' at a step 320. If the determination at the step 320 is negative, the host extension determines a function key is not found and the process terminates with respect to the current field text. If the determination at the step 320 is positive, processing continues at the step 312, as described above. If, at the step 310, it is determined that the first character is not an 'A', processing continues at the step 320 by determining, as discussed above, whether the first character is an 'F'. The above process is repeated for each field within a PS data stream, in order to find all host function key fields.

The above process finds host function key fields that begin with any of the following text combinations:

F#<delimiter>
F##<delimiter>
PF#<delimiter>
PF##<delimiter>
PA#<delimiter>
PA##<delimiter> where <delimiter> is an equal sign, a SPACE, or a NULL and '#' is a decimal digit. In some situations, the text corresponding to a host function key may be split into two separate fields in the PS data stream. If the process shown in FIG. 3 determines that a function key is found and no other text is in the field, the next field text is retrieved and merged with the current field to obtain the text for use as a function key button or hypertext.

Figure 4:
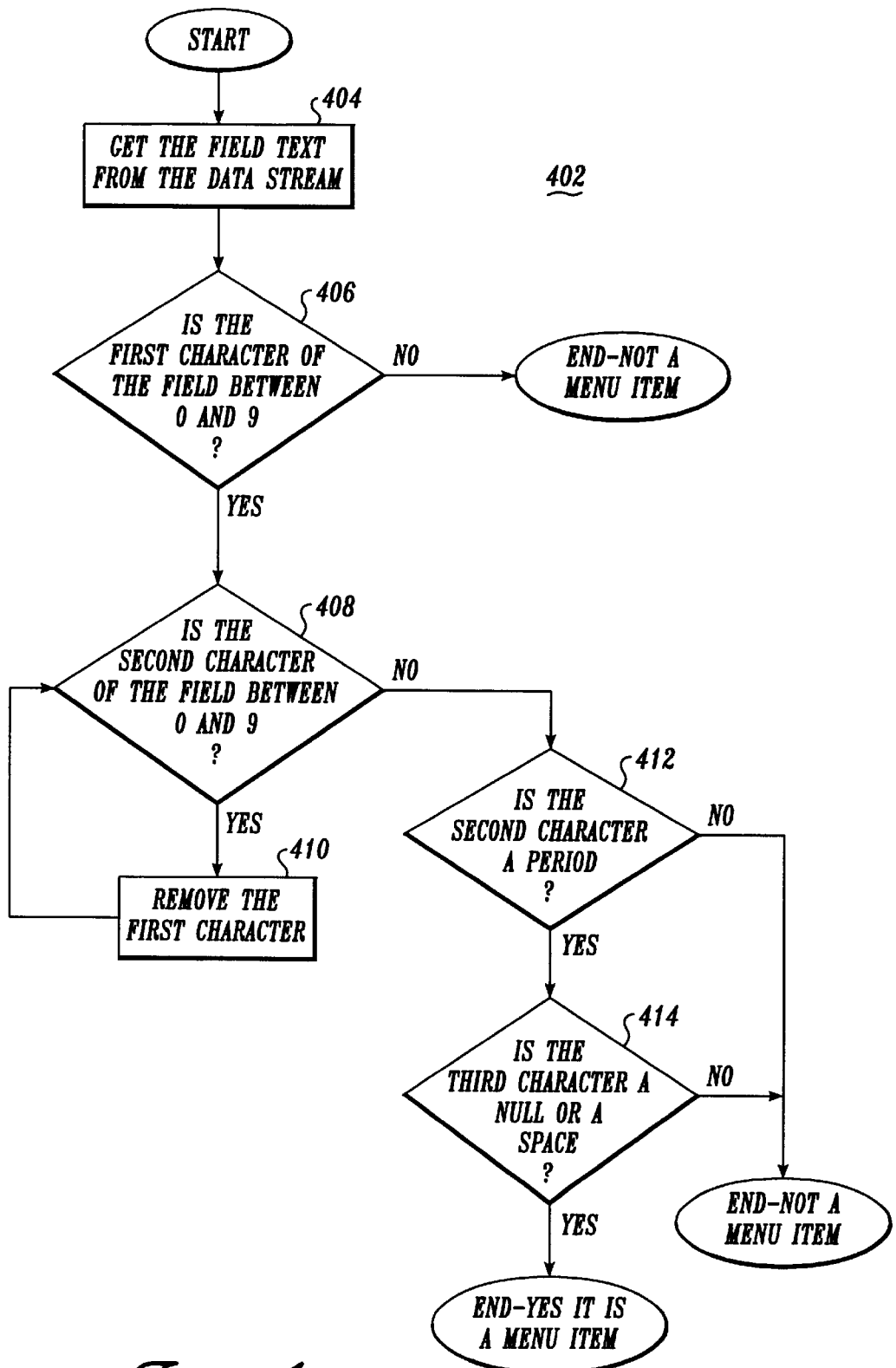
FIG. 4 is a flow diagram illustrating the process of parsing text to determine whether the corresponding field is a menu item field.

FIG. 4 illustrates a series of steps 402 that are performed by the present invention to locate a menu item field. At a step 404, the host extension retrieves a field text, as described above with regard to the process of locating a function key field. At a step 406, the host extension determines whether the first character of the text is a decimal digit. If the first character is not a decimal digit, a menu item field is not found, and the process terminates with respect to the current field text. If it is determined, at step 406, that the first character is a decimal digit, then a determination is made of whether the second character of the text is a decimal digit at a step 408.

If it is determined, at step 408, that the second character is a decimal digit, then the first character is removed from the host extension's local copy at a step 410, thereby making what was previously the third character into the second character. After the step 410, the process loops back to the step 408 and determines whether the new second character is a decimal digit.

If, at the step 408, the second character is not a decimal digit, a determination is made of whether a second character is a period at a step 412. If it is determined, at step 412, that the second character is not a period, a menu item field is not found, and the process 402 terminates with respect to the current field.

If, at the step 412, the determination is made that the second character is a period, a determination is made of whether the third character is a NULL or a SPACE at a step 414. If, at the step 414, the third character is found to not be a NULL or a SPACE, then a menu item field is not found, and the process 402 terminates with respect to the current field. If, at the step 414, the host extension determines that the third character is a NULL or a SPACE, the process terminates, having found a menu item field. The process 402 is repeated for every field received in the PS data stream, in order to find all menu item fields.

The above process finds host menu item fields that begin with the following text string:

(#).<menu item delimiter>
 where (#) indicates one or more consecutive decimal digits, and <menu item delimiter> is a NULL or a SPACE.

Figure 5K:
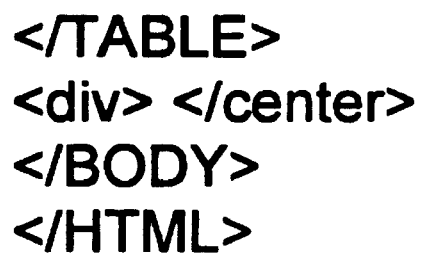

FIGS. 5A and 5B illustrate portions of an exemplary HTML document that is produced by employing the methods, discussed above, to produce the Web page 212 shown in FIG. 2B.

Figure 6:
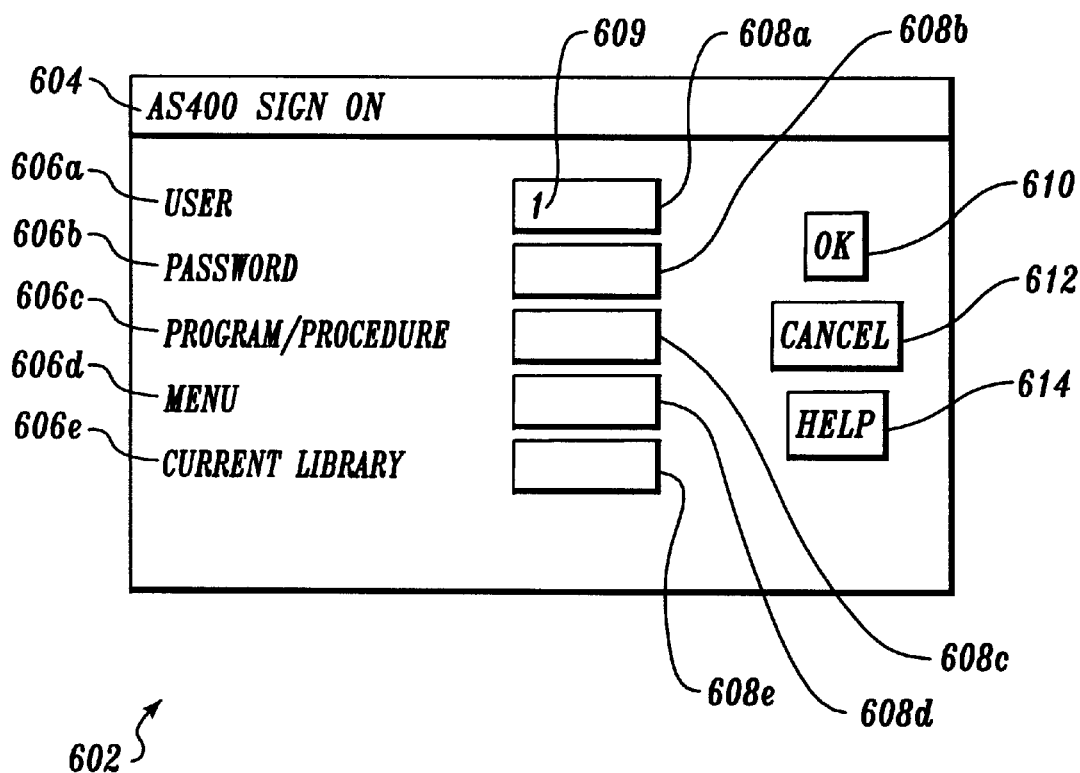
FIG. 6 illustrates a Web page displaying a cursor within a field.

FIG. 6 illustrates a portion of a Web page 602 corresponding to a host computer screen (not shown) that allows a user to enter textual information in a plurality of fields. The host Web page 602 includes a title 604 and a plurality of labels 606a–e that appear as static text. Each label 606a–e has a corresponding edit box 608a–e where a user may enter, via a keyboard, text appropriate to the edit box. In the exemplary Web page 602, the edit box 608a is designated, by its corresponding label 606a, to receive a user's name. Edit box 608b is designated, by its corresponding label 606b, to receive a user's password. Edit box 608c is designated, by its corresponding label 606c, to receive a program name. Edit box 608d is designated, by its corresponding label 606d, to receive a menu name. Edit box 608e is designated, by its corresponding label 606e, to receive a library name.

The depicted Web page 602 further includes a cursor 609 within the edit box 608a currently having the "focus." The focus is a term applied to the edit box that currently accepts keyboard input. When a user enters text at the keyboard, the text is accepted by the computer into the edit box 608a that currently "has the focus." The edit box having the focus is referred to as the "cursor field." The cursor field on a Web page corresponds to an input area on the corresponding host screen that has the focus. Each time the host computer presents a new host screen, a cursor may be in any one of the input areas, depending on which fields already have information, or other factors as determined by the host application program.

A selectable button 610, having the text "OK" displayed thereon, activates a command that accepts the data entered by a user. A selectable button 612, having the text "Cancel" displayed thereon, activates a command that cancels data entered by a user during the time that the Web page had been displayed. A third selectable button 614, having the text "Help" displayed thereon, activates a command that presents help information to a user.

Figure 7:
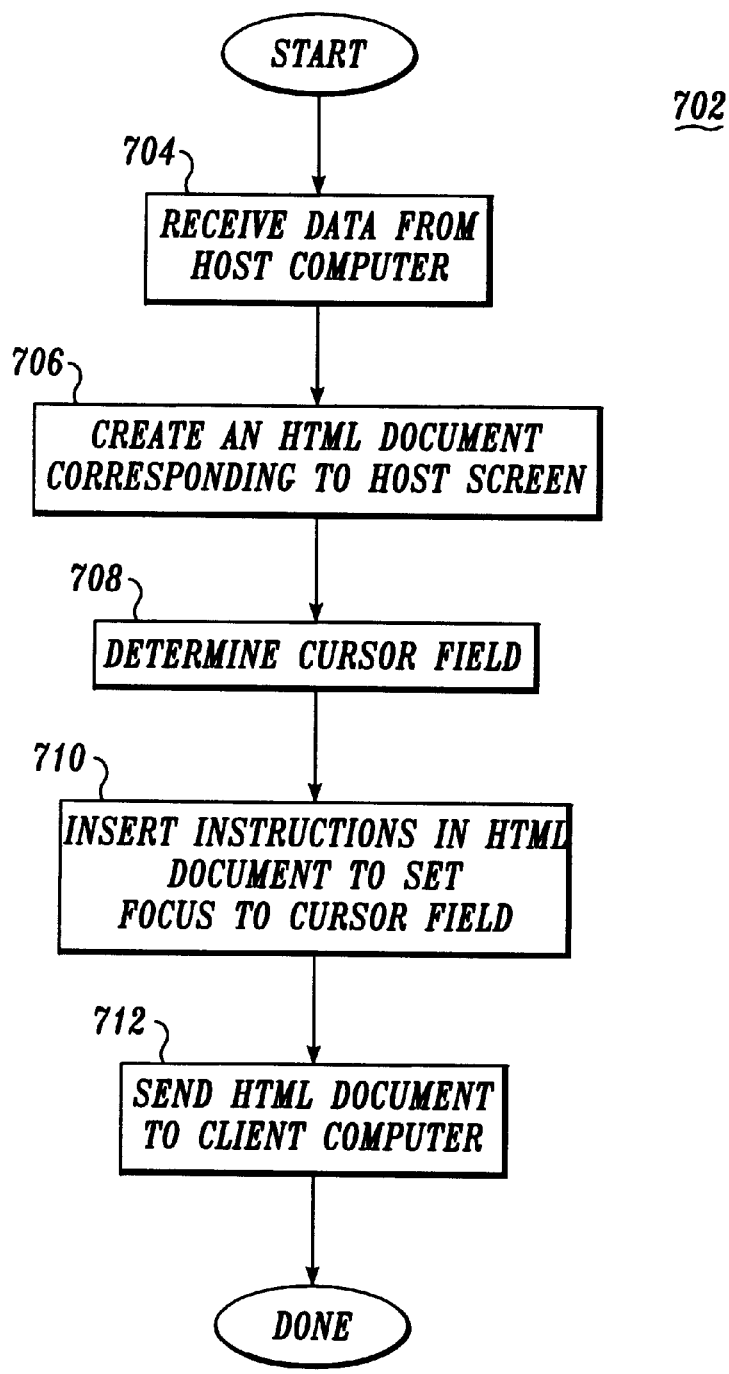
FIG. 7 is a flow diagram illustrating the process of creating an HTML document having instructions to correctly set the cursor.

FIG. 7 is a flow diagram illustrating the process 702 of obtaining information pertaining to the current cursor setting at the host computer and creating an HTML document having instructions to correctly set the position of the cursor in a corresponding Web page. At a step 704, a Display control receives data sent from a host computer in a PS data stream representing a host computer screen. At a step 706, a host extension creates an HTML document containing instructions to create a Web page corresponding to the host computer screen. At a step 708, the host extension and Display control determine the Web page field that is the cursor field. This is the field in which a cursor will initially be located. This step preferably includes the Display control extracting information pertaining to the host focus field and placing the information in a set of properties, as discussed in further detail below. The host extension then queries the Display control for the property information.

At a step 710, the host control creates instructions that set the focus to the cursor field. These instructions are included in the HTML document. As discussed below, the instructions are preferably written in the JavaScript language. At a step 712, the host control sends the HTML document to a client computer.

The following table is an exemplary portion of an HTML document including embedded JavaScript that sets the focus to a particular field within a form defined by an HTML document. The line numbers are for purposes of this discussion only and are not included in the actual document.

```
1)  <html>
2)  <HEAD>
3)  <META  HTTP-EQUIV="REFRESH"  CONTENT="180;
    URL=<!ScriptName>/<!SessionID>/<!UniqueID>/">
4)  <SCRIPT language=javascript>function DisplayHelp(page) {
5)  var path = "/alive/help/" + page;
6)  window.open(path,"ArpeggioLiveHelp","toolbars=1,location=0,
    directories=0,status=1,menubar=1,scrollbars=1,resizable=1,
    copyhistory=0,width=600,height=700");
7)  }
8)  </SCRIPT>
9)  <title>ARPEGGIO(tm)Live!AS/400</title>
10) </HEAD>
11) <BODY bgcolor="white" background="/alive/images/
    paper12l.gif" link="#800000" vlink="#800000"
12) onLoad="document.forms[0].TextInputxR6xC53xL10.focus()">
13) <FORM         METHOD         =         "POST"
    ACTION="<!ScriptName>/Form/<!SessionID>/-
    1141221142/<!UniqueID>/">
14) <CENTER>
15) <table border = 1 bgcolor = "#CCCEC7">
16) <TR>
17) <td bgcolor="3293A1">
18) <font    color="white"><STRONG>AS400         Sign
    On</font></STRONG></TD>
19) </TR>
20) <TR>
21) <TD>
22) <TABLE BORDER=0 cellpadding=10><TR>
23) <TD>
24) <TABLE BORDER=0 cellpadding=0><TR>
25) <TD>
26) <STRONG>
27) User</STRONG>
28) </TD>
29) <TD>
30) <INPUT    TYPE="text"   SIZE=10    MAXLENGTH=10
    NAME="TextInputxR6xC53xL10"         Value=""
    onBlur="this.form.TextInputxR6xC53xL10.value   =
    this.form.TextInputxR6xC53xL10.value.toUpperCase()">
31) </TD>
32) </TR>
33) <TR>
34) <TD>
35) <STRONG>
36) Password </STRONG>
37) </TD>
38) <TD>
39) <INPUT TYPE="password"   SIZE=10   MAXLENGTH=10
    NAME="TextInputxR7xC53xL10"        Value=""
    onBlur="this.form.TextInputxR7xC53xL10.value   =
    this.form.TextInputxR7xC53xL10.value.toUppercase()">
40) </TD>
41) </TR>
42) <TR>
43) <TD>
44) <STRONG>
45) Program/procedure </STRONG>
46) </TD>
47) <TD>
48) <INPUT    TYPE="text"   SIZE=10    MAXLENGTH=10
    NAME="TextInputxR8xC53xL10" Value="">
49) </TD>
50) </TR>
51) <TR>
52) <TD>
53) <STRONG>
54) Menu</STRONG>
55) </TD>
56) <TD>
57) <INPUT    TYPE="text"   SIZE=10    MAXLENGTH=10
    NAME="TextInputxR9xC53xL10" Value=""></TD>
58) </TR>
59) <TR>
60) <TD>
61) <STRONG>
62) Current library </STRONG>
63) </TD>
64) <TD>
```

-continued

```
65) <INPUT    TYPE="text"    SIZE=10    MAXLENGTH=10
    NAME="TextInputxR10xC53xL10" Value=""></TD>
66) </TR>
67) </TABLE>
68) </TD>
69) <TD>
70) <TABLE BORDER=0 cellpadding=10><TR>
71) <TD>
72) <CENTER>
73) <INPUT  TYPE="hidden" NAME="SendKey" value="Enter">
    <INPUT TYPE="submit" VALUE="OK">
74) </CENTER>
75) </TD>
76) </TR>
77) <TR>
78) <TD>
79) <CENTER>
80) <INPUT TYPE="submit" NAME="Logoff" VALUE="Cancel">
81) </CENTER>
82) </TD>
83) </TR>
84) <TR>
85) <TD>
86) <CENTER>
87) <input type="button" value="Help"
88) onclick="DisplayHelp('UserGuide/as400/index.html')">
89) </CENTER>
90) </TD>
91) </TR>
92) </TABLE>
93) </TD>
94) </TR>
95) </TABLE>
96) </TD>
97) </TR>
98) </TABLE>
99) </CENTER>
100) </Form>
101) </FONT>
102) </BODY>
103) <FORM       METHOD     =      "POST"
     ACTION="<!ScriptName>/ShowOriginal/<!SessionID>/-
     1188602465/<!UniqueID>/">
104) <CENTER>
105) <INPUT TYPE="submit" NAME="SHOWORIGINAL"
     VALUE="Show Original Screen">
106) </CENTER>
107) </Form>
```

In the HTML document illustrated above, the statement on line 12 positions the cursor in the field having the specified symbolic name, "TextInputxR6xC53xL10." The field having this name is defined on line 30 above. In the exemplary document, fields are given symbolic names constructed from the row, column, and length of the field.

Figure 8:
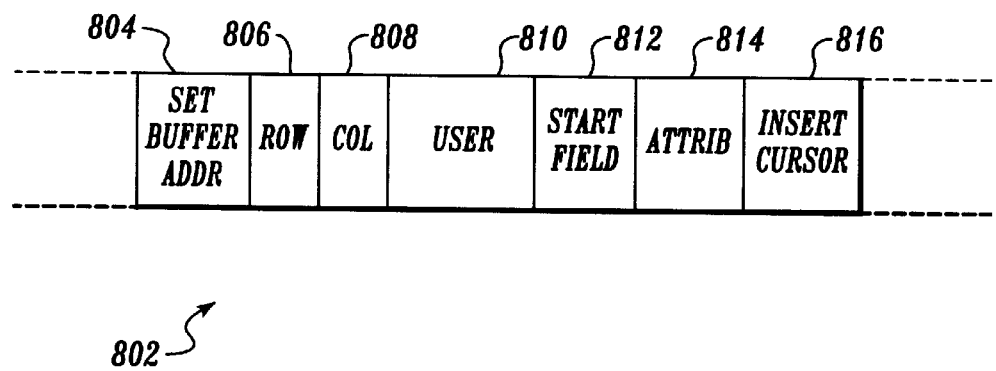
FIG. 8 is a block diagram illustrating a portion of a PS data stream sent from the host computer to a server computer.

FIG. 8 is a block diagram illustrating a portion of an exemplary PS data stream sent from the host computer 106 to a server computer 108. As depicted in FIG. 8, a portion of the PS data stream 802 contains information pertaining to the host screen field corresponding to the "user" label 606a (FIG. 6). The "Set Buffer Address" (SBA) token 884 indicates that the following data specifies the screen buffer coordinates of the corresponding input field. Following the SBA are row data 806 and column data 808 specifying the coordinate position of the "user" label field on the host screen.

A "start field" token 812 follows this portion of the PS data stream 802, indicating that a new field sign immediately follows the "user" field. Attribute data 814 that describes various attributes of the new field follows the start field token. An "insert cursor" token 816 follows the attribute data, and indicates that the new field is the field having the cursor, and therefore the focus.

In the preferred embodiment of the present invention, the Display control 114 scans the PS data stream received from the host computer, and locates the insert cursor token. The Display control then determines the coordinate position of the cursor, in character units, as it is displayed in a host screen corresponding to the PS data stream. Since the row and column of each field may not be provided within a PS data stream, the determination of the cursor coordinates may include calculations based on the coordinates of the previous field and the length of the previous field.

The Display control maintains several properties relating to the input cursor. In particular, the display control includes the following properties:

| Property Name | Explanation |
|---|---|
| CursorColumn | The CursorColumn property contains a long integer indicating the column position of the cursor on the screen. |
| CursorRow | The CursorRow property contains a long integer indicating the row position of the cursor on the screen. |
| CursorSize | The CursorSize property contains a long integer indicating a block cursor size, in screen coordinates. The value defaults to zero. |
| CursorStyle | The CursorStyle property contains a value indicating the style of cursor currently in use. Possible values are:<br>0    block cursor (default)<br>1    cross hair cursor |
| CursorVisible | The CursorVisible property contains a Boolean TRUE if the cursor is visible, and FALSE if it is hidden. TRUE is the default value. |
| CursorBlinkRate | The CursorBlinkRate property contains a long integer indicating the cursor blink rate in milliseconds. The default value is 530 milliseconds. |

In the preferred embodiment, the host extension queries the Display control for the row and column of the cursor in the current host screen, as specified in the PS data stream. The host extension also queries the Display control for the row and column of each field. The row and column of each field is contained within properties of field objects within the Display control, as described in detail in the above-referenced copending application, "Method for Accessing Information on a Host Computer from a Client Computer."

After determining the field within the Web page that is to have the cursor, based upon the information received from the host computer, the host extension creates instructions to set the focus for inclusion within the HTML statements, as described above. As depicted in FIG. 8, the host screen input area having the focus is that following the "user" label. The HTML statements above set the focus to the corresponding edit box 608a, as illustrated in FIG. 6.

Figure 9A:
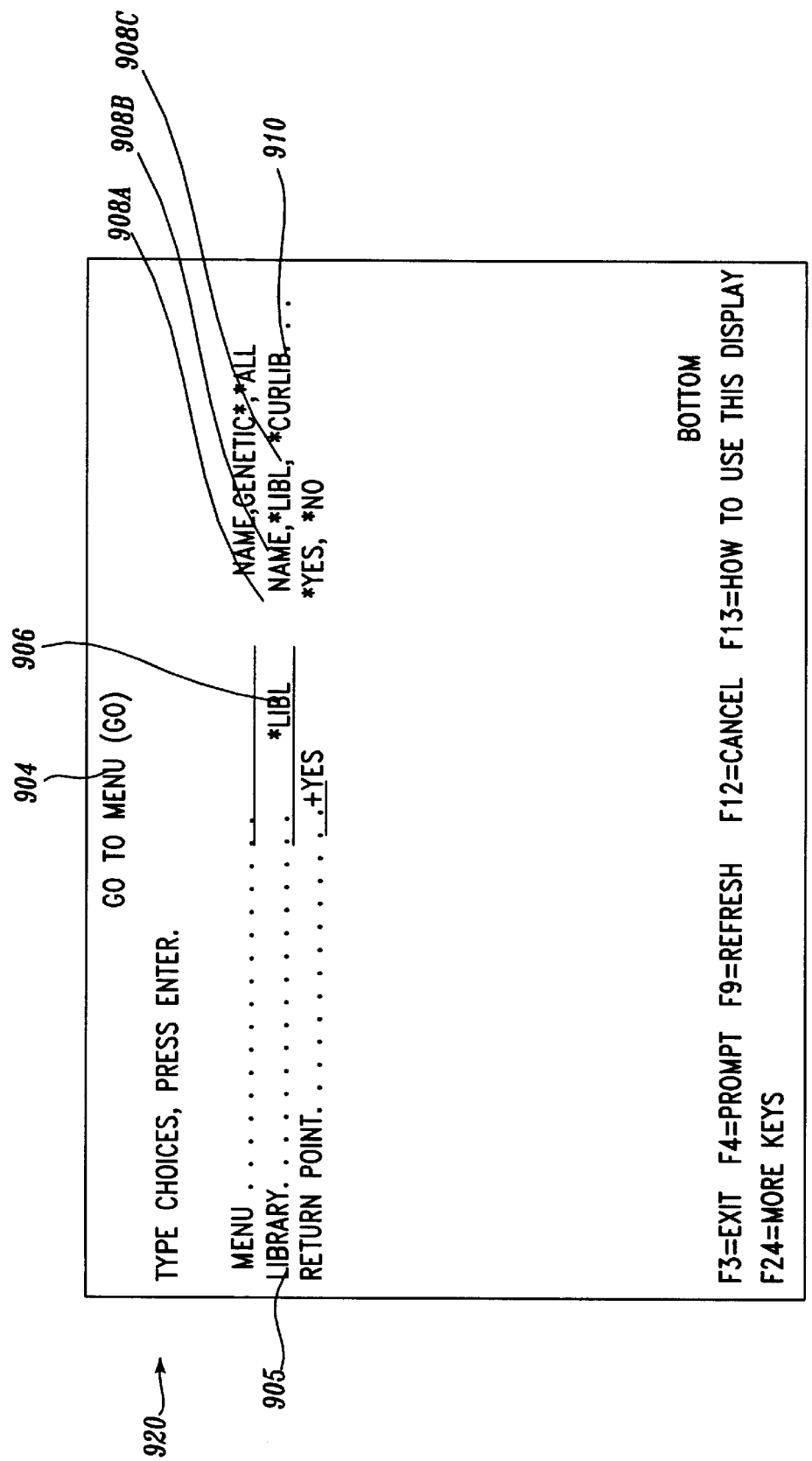
FIGS. 9A and 9B illustrate a host computer screen containing an F4-capable field and a corresponding Web page.

FIG. 9A illustrates a host screen having an "F4-capable" field. The host screen 902 includes title 904 and a label 905, which are both static text, and an edit box 906. Following the edit box 906 is a partial list of text items 908a–c that can be selected for input in the edit box 906. A selection is made by typing in the text of the item. Following the items 908a–c is an ellipses 910 indicating that additional items exist, but are not displayed. When a user places a cursor in the edit box 906 and selects the "F4" function key, the entire list of items is displayed. An F4-capable field can alternatively display the text "F4" instead of an ellipses.

Figure 9B:
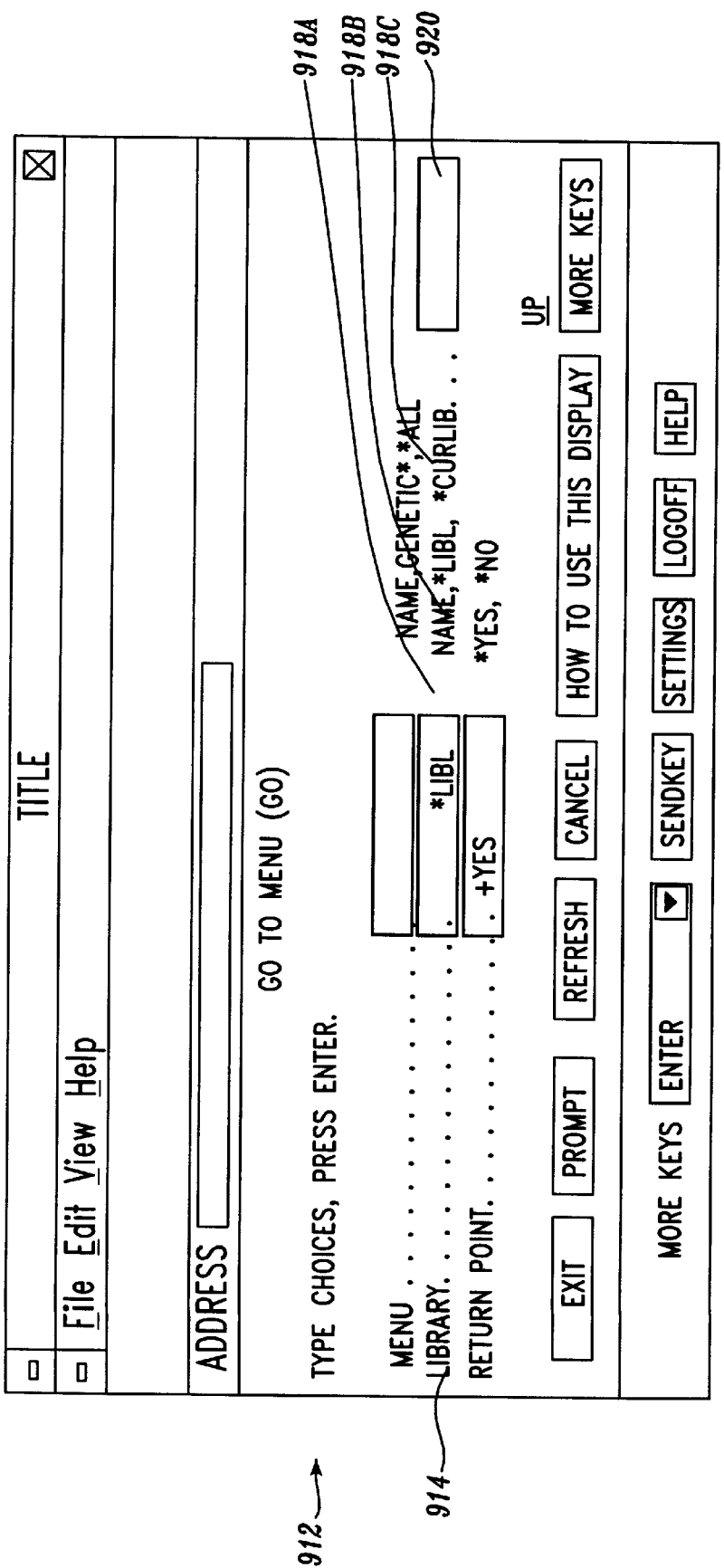

FIG. 9B illustrates a Web page 912 corresponding to the host screen 902. The Web page 912 includes a text label 914 corresponding to the host screen label 904, and a partial list of items 918a–c corresponding to the host screen items 908a–c. The Web page additionally includes a button 920 having an ellipsis as the button label. When a user presses the button 920 by placing the cursor over the button and clicking a mouse button, the additional items of the list, not previously shown, are displayed in a new Web page. Upon selecting one of the items on the new Web page, the screen returns to the previous Web page 912 having the shortened item list.

Figure 10:
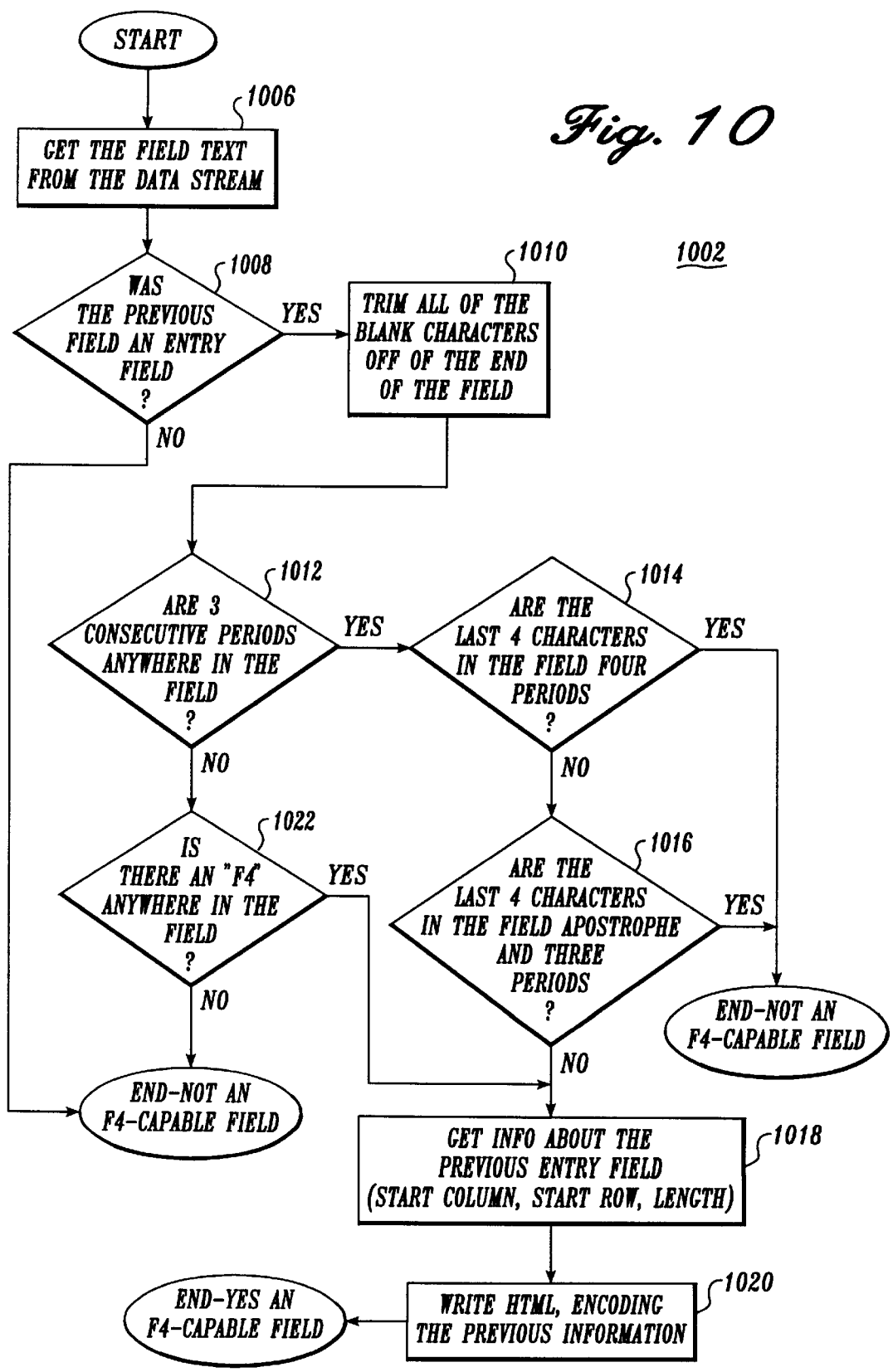
FIG. 10 is a flow diagram illustrating the process of detecting ellipses controls on a host screen and creating a corresponding ellipsis button on a Web page.

FIG. 10 is a flow diagram illustrating a series of process steps 1002 performed by the host extension to detect an ellipses control on a host screen and to create a corresponding ellipsis button on a Web page. At a step 1004, the host extension retrieves information pertaining to an information field as sent from the host computer to the server computer. The retrieval of field information is described above with regard to the process of locating a function key field.

At a step 1006, the host extension retrieves field information, and, in particular, the field text of a field, as sent by the host computer. For purposes of the following discussion pertaining to FIG. 10, the field of the step 1004 is referred to as the "previous" field, and the field of the step 1006 is referred to as the "current" field.

At a step 1008, a determination is made of whether the previous field is an "entry" field. Each field received in a PS data stream is marked as either a protected field or an unprotected field. A Display control receiving this information enters a Boolean value in a Protected property of the object corresponding to the field. The host extension retrieves this property to determine whether a field is an entry field. If a field is unprotected, information can be entered by a user into the field, and therefore it is an entry field. If the field is protected, the field is not an entry field. If, at the step 1008, the previous field is found to not be an entry field, the current field cannot be an F4-capable field, and the process terminates.

If at the step 1008 the previous field is found to be an entry field, the processing continues at a step 1010 by trimming all of the blank characters from the end of the field text. At a step 1012, a test is made to determine whether the character string comprising three consecutive periods (e.g., " . . . ") appears anywhere in the field text. If the result of this test 1012 is positive, a test is made to determine whether the last four characters in the field text are the character string comprising four consecutive periods (e.g., " . . . .") at a step 1014. If the result of this test 1014 is positive, the current field is not an F4-capable field and the process terminates.

If the result of the test 1014 is negative, at a step 1016 a test is made of whether the last four characters of the field text are the character string comprising one apostrophe immediately followed by three consecutive periods (e.g., "' . . . "). If the result of this test 1016 is positive, the current field is not an F4-capable field and the process terminates.

If the result of the test 1016 is negative, the present field is an F4-capable field. Processing then continues to a step 1018, where further information is retrieved pertaining to the previous field. Specifically, the starting column, the starting row, and the length of the previous field are retrieved. At a step 1020, the host extension creates HTML statements encoding the information pertaining to the previous entry field. The process then terminates, having found an F4-capable field.

If, at the step 1012, the character string comprising three consecutive periods is not found within the current field text, a test is made to determine whether the characters "F4" exist within the current field text at a step 1022. If the result of this test is negative, the current field is not an F4-capable field, and the process terminates. If the result of the test 1022 is positive, the current field is an F4-capable field, and processing continues at the steps 1018 and 1020 to create the applicable HTML code.

FIGS. 11A and 11B illustrate a portion of an exemplary HTML document that is produced by employing the methods discussed above, to produce the Web page 912 as shown in FIG. 9B.

The present invention also provides users, in particular, system administrators, the ability to create custom Web pages corresponding to particular host screens. A set of files, each file comprising an HTML template, is maintained on the Web server. When the host extension receives a new PS data stream corresponding to a host screen, the host extension determines whether an HTML template corresponding to the new host screen exists on the Web server. If a corresponding HTML template is found, it is sent to the client computer and used to create the Web page presenting the information on the host screen. Following is a description of the process of utilizing page templates.

Figure 12A:
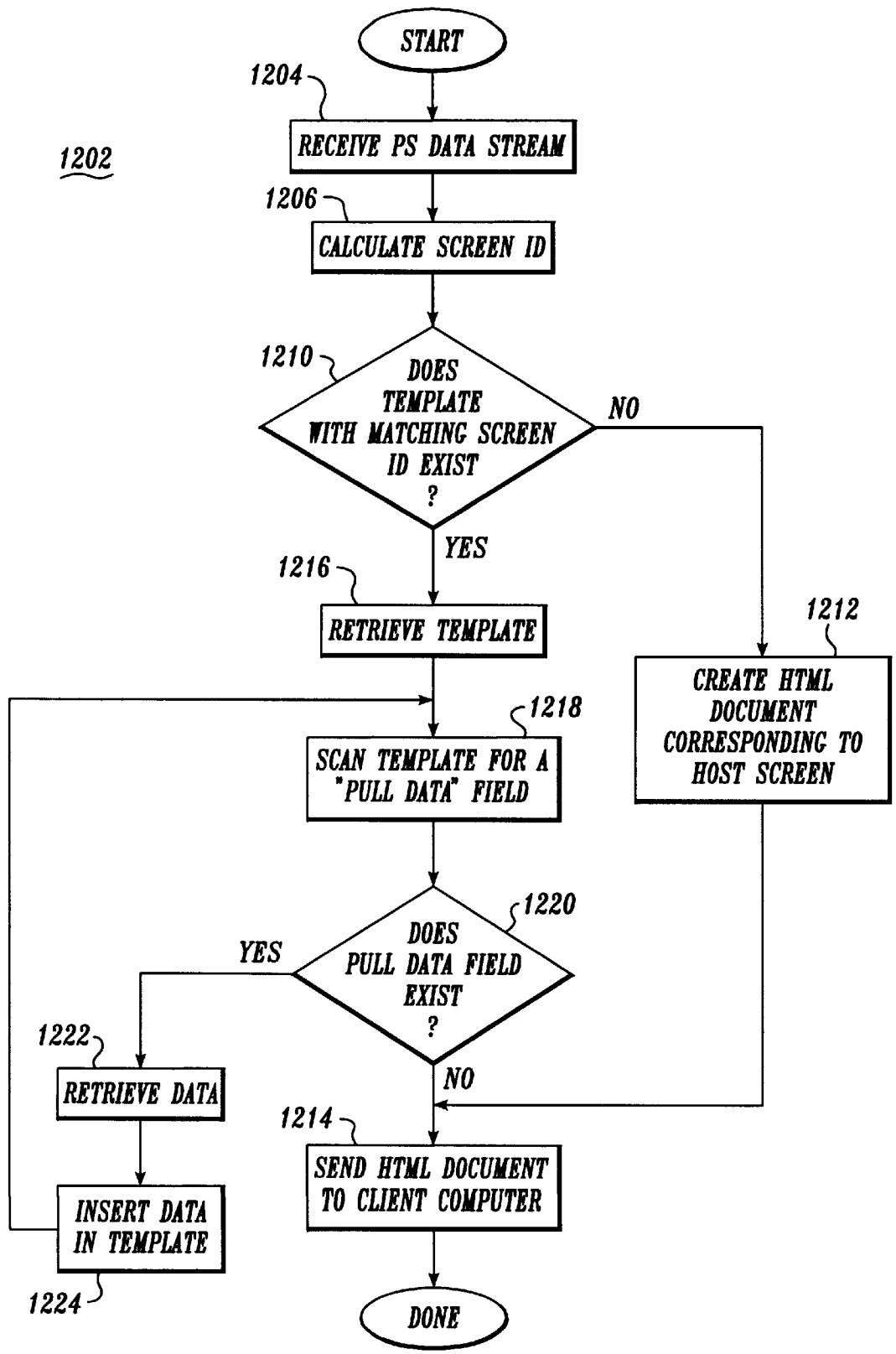

FIGS. 12A and 12B are flow diagrams illustrating the process of determining whether a new host screen corresponds to an existing HTML template, and creating a Web page accordingly. At a step 1204, the Display control receives a PS data stream representing a host screen from the host computer. At a step 1206, the Display control calculates a screen ID based on the new host screen. A screen ID is a result of a calculation that factors in the coordinate positions and contents of fields within a host screen. The calculation of a screen ID utilizes an algorithm designed so that unique host screens have unique corresponding screen IDs, thereby establishing a one-to-one relationship between screen IDs and unique host screens.

At a step 1210, the host extension receives a new screen ID from the Display control and determines whether an HTML template having an associated screen ID matching the new screen ID exists. This determination is illustrated in further detail by FIG. 12B, and explained below. If a matching template is not found, at a step 1212, the host extension creates an HTML file based on the new host screen, according to the mechanisms described above. At a step 1214, the Web server process 118 (shown in FIG. 1) receives from the host extension the new HTML file and forwards this file to the client computer 104.

If, at the step 1210, a matching HTML template is found, at a step 1216, the host extension retrieves the matching HTML template. At a step 1218, the host extension scans the HTML template for a "pull data" field. A pull data field is a field, embedded in an HTML template, that specifies information is to be retrieved from the host computer screen corresponding to the HTML template. The pull data field specifies the particular data that is required. It is used when a Web page includes one or more particular fields that can change, although the rest of the Web page remains constant. For example, a Web page having a calendar or clock included therein can be implemented using one or more pull data fields to specify that the contents of the calendar or clock field must be retrieved. The information to be retrieved is in the corresponding host computer screen.

The following is an exemplary statement including a pull data field in an HTML file:

<!PullData.[2].[30].[23]>

The numbers "2" and "30" in the pull data field indicate the row and column, respectively, of the desired information in the host screen. The number 23 indicates the length of the field in the host screen.

At a step 1220, the host extension, based on the scan of the step 1218, determines whether a pull data field exists. If, at the step 1220, a pull data field is found, the host extension queries the Display control for the data at a step 1222. At a step 1224, the host extension inserts the newly retrieved data in the HTML template at the position of the pull data field. Control then returns to the step 1218, to scan the template for the next pull data field.

If, at the test 1220, a pull data field is not found, processing proceeds to a step 1214, where the host extension sends the HTML template to the Web server process, which then forwards the HTML document to the client computer.

FIG. 12B illustrates in further detail the step 1210 of determining whether an HTML template that matches the screen ID exists. Prior to a discussion of this determination, a brief explanation of the use of bandwidth information in accordance with the invention is provided.

The rate at which a client computer 104 receives data from the Web server computer 108 is referred to as the bandwidth. A system having a high bandwidth receives data faster than a system having a low bandwidth. The length of time that a user must wait for a client computer to receive an HTML document and associated data is reduced by minimizing the size of the files that are downloaded from the Web server to the client computer. Also, a client computer having low screen resolution capabilities may be considered to be low bandwidth, since it does not use the large amounts of data that represent high resolution images. The extra time required to receive high resolution images is not necessary for a computer having low screen resolution. Additional reasons may exist for a client computer to be considered low bandwidth, such as a user preference to receive HTML files quickly, foregoing high resolution images. The present invention provides a method for reducing the data transfer time by providing two sets of HTML documents that are transferred from the server computer to the client computer. Having a knowledge of whether the system is operating in a low bandwidth mode or a high bandwidth mode, the host extension provides to the server process either a low bandwidth HTML document or a high bandwidth HTML document. The low bandwidth HTML documents contain less data, or reference files that contain less data, and therefore can be transferred across the network faster.

A user at the client computer may be presented with a choice of whether to operate in low bandwidth mode or high bandwidth mode. This choice may be selected in a Web page.

Returning to FIG. 12B, at a step 1230, a determination is made of whether communication with the Web browser is operating in low bandwidth mode or high bandwidth mode. If the communication is operating in low bandwidth mode, the host extension conducts a search, at a step 1232, for a low bandwidth template having a screen ID that matches the host screen ID calculated in the step 1206, for the corresponding host connection. A preferable mechanism for conducting this search includes organizing HTML template files by directories and file names. Each host connection has one corresponding directory of HTML templates. The HTML template files have a name according to the format:

<screen ID>low.html        (1)

where <screen ID> is the screen identifier. If a matching HTML template file is found at the step 1232, the determination is complete.

If, at the step 1232, a file is not found, then at a step 1234 a similar search is conducted in the directory corresponding to all host connections. In accordance with the present invention, a single server computer can simultaneously support connections between multiple host computers and a single client computer. A user creating an HTML template specifies whether the template is to be used for a particular host connection or for all host connections. A preferable way to organize the templates is to have all templates corresponding to an individual host connection in a directory, where one directory exists for each host connection. In addition, a directory exists for templates that are designated to be used for all host connections. During the step 1210 of determining whether an HTML template exists for the current screen ID, a search is first made, at the step 1232, in the directory corresponding to the particular host connection. If a template is not found, at the step 1234, a search is made in the directory corresponding to all host connections. If, at the step 1232, a matching HTML template file is found, the determination 1210 is complete, and the result is a positive match. If, at the step 1234, a matching file is not found, the determination 1210 is complete, and the determination is negative.

If, at the step 1230, it is determined that the system is not in low bandwidth mode, a search is conducted, at a step 1236, for a high bandwidth HTML template file corresponding to the screen ID and the present host connection. In accordance with the file name format discussed above, a preferred file name format for high bandwidth files is:

<screen ID>.html        (2)

where the <screen ID> has the same meaning as discussed above for low bandwidth files. If, at the step 1236, a matching high bandwidth HTML template file is found, the determination 1210 is complete, and the result is positive.

If, at the step 1236, a matching file is not found, at a step 1238, a search is made in a directory corresponding to all host connections. If, at the step 1238, a matching HTML template file is found positive. The location of the matching HTML template file is saved in order to retrieve the file.

Figure 13:
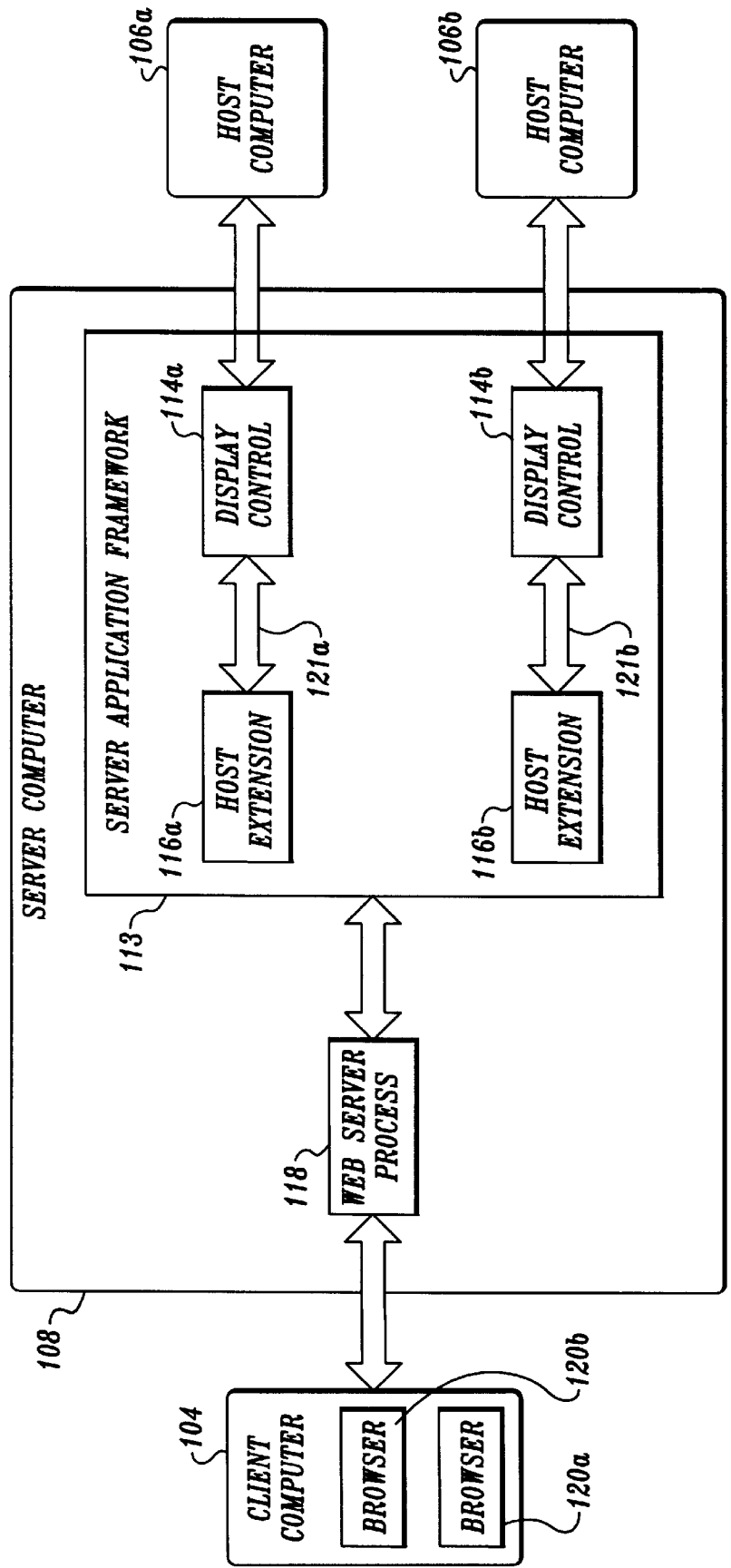
FIG. 13 is a block diagram illustrating an architecture having two communication sessions concurrently active.

As discussed briefly above, in accordance with the present invention, a server computer can control communications between a single client computer and multiple host computers concurrently. FIG. 13 illustrates an architecture having a client computer 104 communicating with two host computers 106*a* and 106*b*. Two Display controls 114*a* and 114*b* are active on the server computer 108, each Display control corresponding to, and communicating with, one host computer. The corresponding communication mediums 112*a* and 112*b* may be physically distinct communication mediums, or, in the case of a network, the same physical communication medium utilizing network protocols to distinguish communications transferred across the medium. Each Display control 114*a* and 114*b* has a corresponding host extension 116*a* and 116*b*, communicating over respective corresponding bidirectional data paths 121*a* and 121*b*.

One Web server process 118 is active on the server computer 108. The Web server process 118 communicates with the host extensions 116*a* and 116*b* via the server application framework, as described below.

As depicted in FIG. 13, two Web browser applications 120*a* and 120*b* are active on the client computer 104, each Web browser application corresponding to one host computer. When a connection is established between a Web browser 120*a* and a host computer 106*a*, the server application framework creates a unique session ID. Thereafter, when an HTML document is sent from the server computer to the client computer, the unique session ID corresponding to the host extension 116*a* is included in each URL within the HTML document. When a user selects a hyperlink or button on the Web page, the URL containing the session ID is sent by the Web browser over the network to the Web server process 118, and forwarded to the server application framework. The server application framework extracts the session ID, and uses the session ID as an indication of which host extension to communicate with in response to the URL received from the Web browser.

Following is an exemplary HTML statement illustrating a URL containing a session ID:

<A HREF="/Scripts/Liveiis.Dll/MenuItem/60575/1/1307221321/68583D">    (3)

The value "60575" is the session ID in the above URL. The value "1307221321" is the screen ID. The last number, "68583D" is a unique identifier. The unique identifier is created to be unique for each hyperlink on each Web page. Web browser applications save, on a disk, a set of recently accessed hyperlinks and their corresponding HTML pages, and retrieve HTML documents from this "cache" when the corresponding hyperlink is selected a second time. Hyperlinks that are within the Web browsers disk cache are typically given a different appearance, such as a different color, on the display screen. In order to prevent caching of hyperlinks and corresponding HTML documents, the present invention includes the unique identifier in each URL, so that a Web browser never finds a selected URL within its disk cache.

Figure 14:
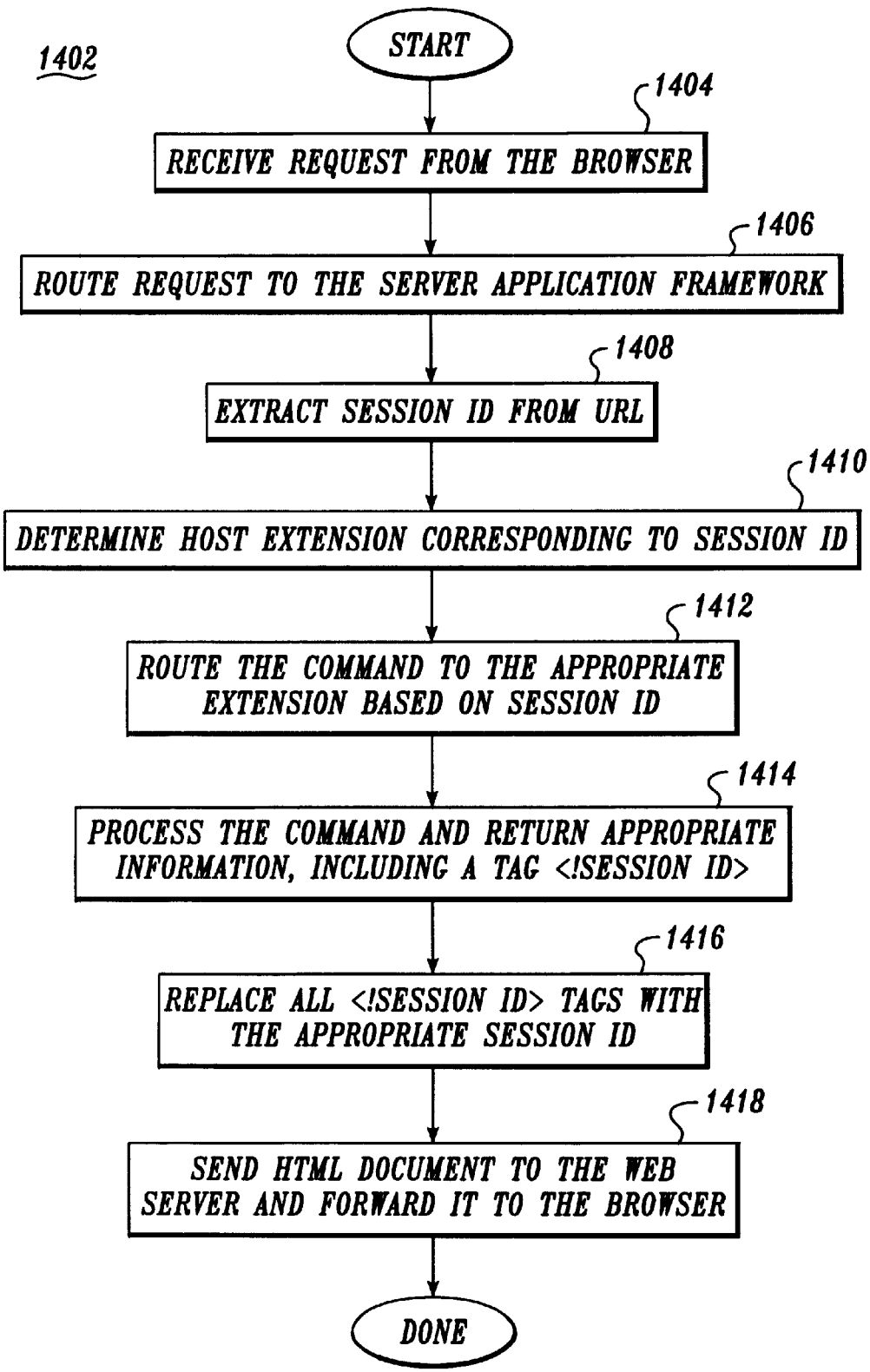
FIG. 14 is a flow diagram illustrating the process maintaining multiple communication sessions between a client computer and multiple host computers.

FIG. 14 is a flow diagram illustrating a series of process steps 1402 performed by the host extension to maintain multiple communication sessions between a client computer and multiple host computers. At a step 1404, the Web server process receives a request from a Web browser 120a running on the client computer 104. The request includes a session ID, as described above. At a step 1406, the Web server process forwards the request to the server application framework. At a step 1408, the server application framework extracts the session ID from the request. At a step 1410, the server application framework determines the host extension 116a corresponding to the session ID. Preferably, the server application framework maintains in memory a table of active session IDs and corresponding host extensions, and utilizes this table to determine the proper host extension for a request from the Web browser. A new session 10 and a corresponding table entry are created when a user logs in to a host session, the table entry is deleted when the user logs off. At a step 1412, the server application framework routes the request from the Web browser to the appropriate host extension 116a.

At a step 1414, the host extension 116a processes the request and returns appropriate information to the server application framework. Processing the command may include querying the Display control 114a for information, or sending a command to the Display control that is forwarded to the corresponding host computer 106a. If a command is forwarded to the host computer 106a, the host computer returns the information to the Display control in a PS data stream. The Display control then passes the information to the host extension. The information that the host extension returns to the server application framework may comprise a new HTML document.

When the host extension creates an HTML document, it inserts, within the URLs that are included within the document, tags that identify where the session ID is to be placed. For example, the host extension may create the following HTML statement, corresponding to the HTML statement 3 above <A HREF="/Scripts/Liveiis.Dll/MenuItem/<!SessionID>/1/1307221321/<UniqueI D">    (4)

At a step 1416, the server application framework replaces all of the <!SESSION ID> tags with the appropriate session ID. A host extension, therefore, does not need to be aware of the session ID corresponding to itself The server application framework creates, and is the only process that interprets, session IDs.

As illustrated above, the host extension also inserts a tag that is a placeholder for a unique identifier. The server application framework replaces this tag with a unique identifier, in order to avoid caching by the Web Browser, as discussed above.

At a step 1418, the server application framework passes the information or HTML document to the Web server process 118. The Web server process sends the information, or HTML document, to the originating Web browser 120a on the client computer 104. Commercially available Web server applications include the ability to keep track of multiple Web browser applications in order to handle a request from a Web browser application and return a new HTML document to the originating Web browser application. The invention, as described above, allows a Web server process to communicate with multiple processes on the server computer. The existence of multiple processes, or host extensions, on the server computer is transparent to the Web server process, which need only communicate with a single server application framework. A unique session ID corresponding to a host extension is created when a Web browser initiates communication with a host computer through a host extension, and remains a valid session ID until the session between the Web browser and the host computer terminates.

A host computer screen may also include light pen-enabled fields. These are fields that are selectable with a light pen at the host computer. Two types of light pen-enabled fields exist: immediate light pen fields and delayed light pen fields. When a user at the host computer selects an immediate light pen-enabled field, a command is executed. When a user at the host computer selects a delayed light pen-enabled field, an indication is made on the host screen that the field has been selected.

The invention includes a method of detecting light pen-enabled fields and creating corresponding instructions in an HTML document to produce fields on a Web page corresponding to the light pen-enabled fields. When an immediate light pen-enabled field is detected in a PS data stream, instructions to produce a button having text contained thereon are created. When a user at the client computer selects the button, a command is sent from the client computer to the host extension.

When a delayed light pen-enabled field is detected in a PS data stream, instructions to produce a field containing text and a toggle character immediately preceding the text are created. When a user at the client computer selects the field, the toggle character changes from a first character to a second character. When the user selects the same field a second time, the toggle character changes back to the first character. The preferred toggle characters are a question mark ('?') and a "greater than" sign ('>'). The question mark indicates that the field is not selected. The "greater than" sign indicates that a user has selected the field.

While the preferred embodiment of the invention has been illustrated and described, it will be appreciated that various changes can be made therein without departing from the spirit and scope of the invention.

What is claimed is:

1. A system for controlling the transmission of information between a host computer and a remotely located client computer, the system comprising:

a client computer which includes a browser application for viewing Web pages and is linked to a server computer by a network;

a host computer which is linked to the server computer by a communication medium;

the server computer comprising:
  a send/receive module receiving data that is transmitted from the host computer, the data representative of a host computer display screen having a function key-capable field that represents an incomplete list of items included in the host computer display screen;
  a parsing module, upon receipt of the data transmitted from the host computer by the server computer, parsing the data to locate the function key-capable field;
  a creation module creating, at the server computer, at least one instruction corresponding to the function key-capable field that when received by the Web browser causes a control and an incomplete list of items to be created and displayed in a Web page that represents the host computer display screen, the control being selectable to cause a complete list of items to be displayed in the Web page,
  the send/receive module transmitting the instruction to the client computer, receiving a command from the client computer with the command indicative of a user selection of the selectable control, sending a request for a complete list of items to the host computer, and receiving, at the server computer, additional data including information pertaining to the complete list of items from the host computer;
  the creation module displaying the additional data on a Web page that represents the host computer display screen; and
  the send/receive module transmitting, from the server computer to the client computer, additional instructions that cause the Web browser to produce a second Web page containing the complete list of items from the host computer.

2. The system of claim 1, wherein the first set of instructions and the second set of instructions comprise statements in the Hypertext Markup Language.

3. The system of claim 1, wherein the predetermined function key is an F4 function key.

4. The system of claim 1, wherein the host computer is an IBM AS/400 computer.

5. The system of claim 1, wherein the host computer is an IBM mainframe computer.

6. The system of claim 1, wherein the selectable control is a button.

7. The system of claim 1, wherein the parsing module further comprises:
  a field parsing module determining whether a character string comprising three consecutive periods exists in a field of the data; determining whether a character string comprising four consecutive periods exists in the field of the data; determining whether a character string comprising an apostrophe immediately followed by three consecutive periods exists in the field of the data; if the character string comprising four consecutive periods exists in the field, determining that the field of the data is not a function key-capable field; if the character string comprising an apostrophe immediately followed by three consecutive periods exists in the field, determining that the field of the data is not a function key-capable field; and if the character string comprising three consecutive periods exists in the field and the character string comprising four consecutive periods does not exist in the field and the character string comprising an apostrophe immediately followed by three consecutive periods does not exist in the field, determining that the field is a function key-capable field.

8. The system of claim 7, further comprising:
  the field parsing module determining whether a previous field immediately prior to the field of data is an entry field; and if the previous field is not an entry field, determining that the field of data is not an entry field.

9. The system of claim 1, wherein the network linking the client computer and the server computer is the Internet.

10. The system of claim 1, wherein the network linking the client computer and the server computer is a Local Area Network.

11. A system for controlling the transmission of information between a host computer and a remotely located client computer, the system comprising:
  a client computer which includes a browser application and is linked to a server computer by a network;
  a host computer which is linked to the server computer by a communications medium;
  the server computer comprising:
    an intermediary module receiving data transmitted from the host computer, the data representative of a host computer display screen; and
    a server application framework determining whether an instruction template corresponding to the host computer screen exists; if the instruction template corresponding to the host computer screen exists, transmitting the instruction template to the client computer; and if the instruction template corresponding to the host computer screen does not exist, creating a set of instructions having a portion of the data that is transmitted from the host computer and received by the server computer and transmitting the set of instructions to the client computer.

12. The system of claim 11, wherein the instruction template includes a pull data field that specifies information desired from the host computer, further comprising:
  the server application framework locating the pull data field; retrieving the information desired from the host computer; and inserting the information desired from the host computer into the instruction template.

13. The system of claim 12, wherein the insertion of the information into the instruction template is performed prior to the transmitting the instruction template to the client computer.

14. The system of claim 11, further comprising:
  the server application framework determining whether the client computer is operating in a low-bandwidth mode; if the client computer is operating in a low-bandwidth mode and a low-bandwidth instruction template corresponding to the host computer screen exists, transmitting the low-bandwidth instruction template to the client computer; and if the client computer is not operating in a low-bandwidth mode a high-bandwidth instruction template corresponding to the host computer screen exists, transmitting the high-bandwidth instruction template to the client computer, wherein the low-bandwidth instruction template is different from the high-bandwidth instruction template.

15. The system of claim 11, wherein a plurality of instruction templates exist, each template having an associated screen identifier, further comprising:
  the server application framework further comprising determining a host screen identifier corresponding to the host computer screen; and wherein the determining whether an instruction template corresponding to the host computer screen exists includes determining whether an instruction template having an associated screen identifier that matches the host screen identifier exists.

16. The system of claim 15, wherein the determining whether an instruction template corresponding to the host computer screen exists includes:

if an instruction template corresponding to the host computer does not exist, determining whether an alternate instruction template having an associated screen identifier that matches the host screen identifier exists, wherein the alternate instruction template corresponds to a computer screen of a second host computer; and if the alternate instruction template exists, transmitting the alternate instruction template to the client computer.

17. A system for controlling the transmission of information between a host computer and a remotely located client computer, wherein the, and the, the system comprising:

a client computer which includes a browser application and is linked to a server computer by a network;

a host computer which is linked to the server computer by a communications medium;

the server computer comprising:

a display control receiving, at the server computer, data that is transmitted from the host computer, the data representative of a host computer display screen; and a host extension determining whether the data transmitted from the host computer includes at least one menu item field; if the data transmitted from the host computer includes at least one menu item field, creating at least one instruction that represents a hyperlink field corresponding to the menu item field; determining whether the data transmitted from the host computer includes at least one function key field; if the data transmitted from the host computer includes at least one function key-capable field, creating at least one instruction that represents a hyperlink field corresponding to the function key field; determining whether the data transmitted from the host computer includes at least one light pen-enabled field; if the data transmitted from the host computer includes at least one light pen-enabled field, creating at least one instruction that represents a hyperlink field corresponding to the light pen-enabled fields; determining whether the data transmitted from the host computer includes at least one function key-capable field; and if the data transmitted from the host computer includes at least one function key-capable field, creating at least one instruction that represents a button control corresponding to the function key-capable field.

18. A system for controlling the transmission of information between a host computer and a remotely located client computer, the system comprising:

a client computer which includes a browser application and is linked to a server computer by a network;

a host computer which is linked to the server computer by a communication medium;

the server computer comprising:

a display control receiving, at the server computer, data that is transmitted from the host computer, the data representative of a host computer display screen having multiple fields and a cursor positioned in a focus field; and a host extension automatically creating a set of instructions representing web page fields corresponding to the fields of the host screen; determining that one of the web page fields is a cursor field corresponding to the focus field of the host screen; automatically creating at least one cursor positioning instruction in the set of instructions, the cursor positioning instruction representing the information that a cursor is to be positioned within the cursor field; and transmitting the set of instructions to the client computer.

19. The system of claim 18, wherein the communication medium linking the host computer to the server computer is an SNA network and the data received from the host computer comprises a data stream including an insert cursor token indicative of the focus field.

20. The system of claim 19, wherein the set of instructions includes instructions in the Hypertext Markup Language.

21. A computer-readable storage medium storing code for controlling the transmission of information between a host computer and a remotely located client computer, the system comprising:

a client computer which includes a browser application for viewing Web pages and is linked to a server computer by a network;

a host computer which is linked to the server computer by a communication medium;

the server computer comprising:

a send/receive module receiving data that is transmitted from the host computer, the data representative of a host computer display screen having a function key-capable field that represents an incomplete list of items included in the host computer display screen;

a parsing module, upon receipt of the data transmitted from the host computer by the server computer, parsing the data to locate the function key-capable field;

a creation module creating, at the server computer, at least one instruction corresponding to the function key-capable field that when received by the Web browser causes a control and an incomplete list of items to be created and displayed in a Web page that represents the host computer display screen, the control being selectable to cause a complete list of items to be displayed in the Web page, the send/receive module transmitting the instruction to the client computer, receiving a command from the client computer with the command indicative of a user selection of the selectable control, sending a request for a complete list of items to the host computer, and receiving, at the server computer, additional data including information pertaining to the complete list of items from the host computer;

the creation module displaying the additional data on a Web page that represents the host computer display screen; and the send/receive module transmitting, from the server computer to the client computer, additional instructions that cause the Web browser to produce a second Web page containing the complete list of items from the host computer.

22. The storage medium of claim 1, wherein the first set of instructions and the second set of instructions comprise statements in the Hypertext Markup Language.

23. The storage medium of claim 1, wherein the predetermined function key is an F4 function key.

24. The storage medium of claim 1, wherein the host computer is an IBM AS/400 computer.

25. The storage medium of claim 1, wherein the host computer is an IBM mainframe computer.

26. The storage medium of claim 1, wherein the selectable control is a button.

27. The storage medium of claim 1, wherein the parsing module further comprises:

a field parsing module determining whether a character string comprising three consecutive periods exists in a field of the data; determining whether a character string comprising four consecutive periods exists in the field of the data; determining whether a character string comprising an apostrophe immediately followed by three consecutive periods exists in the field of the data; if the character string comprising four consecutive periods exists in the field, determining that the field of the data is not a function key-capable field; if the character string comprising an apostrophe immediately followed by three consecutive periods exists in the field, determining that the field of the data is not a function key-capable field; and if the character string comprising three consecutive periods exists in the field and the character string comprising four consecutive periods does not exist in the field and the character string comprising an apostrophe immediately followed by three consecutive periods does not exist in the field, determining that the field is a function key-capable field.

28. The storage medium of claim 7, further comprising:
the field parsing module determining whether a previous field immediately prior to the field of data is an entry field; and if the previous field is not an entry field, determining that the field of data is not an entry field.

29. The storage medium of claim 1, wherein the network linking the client computer and the server computer is the Internet.

30. The storage medium of claim 1, wherein the network linking the client computer and the server computer is a Local Area Network.

31. A computer-readable storage medium storing code for controlling the transmission of information between a host computer and a remotely located client computer, the system comprising:
a client computer which includes a browser application and is linked to a server computer by a network;
a host computer which is linked to the server computer by a communications medium;
the server computer comprising:
an intermediary module receiving data transmitted from the host computer, the data representative of a host computer display screen; and
a server application framework determining whether an instruction template corresponding to the host computer screen exists; if the instruction template corresponding to the host computer screen exists, transmitting the instruction template to the client computer; and if the instruction template corresponding to the host computer screen does not exist, creating a set of instructions having a portion of the data that is transmitted from the host computer and received by the server computer and transmitting the set of instructions to the client computer.

32. The storage medium of claim 11, wherein the instruction template includes a pull data field that specifies information desired from the host computer, further comprising:
the server application framework locating the pull data field; retrieving the information desired from the host computer; and inserting the information desired from the host computer into the instruction template.

33. The storage medium of claim 12, wherein the insertion of the information into the instruction template is performed prior to the transmitting the instruction template to the client computer.

34. The storage medium of claim 11, further comprising:
the server application framework determining whether the client computer is operating in a low-bandwidth mode; if the client computer is operating in a low-bandwidth mode and a low-bandwidth instruction template corresponding to the host computer screen exists, transmitting the low-bandwidth instruction template to the client computer; and if the client computer is not operating in a low-bandwidth mode a high-bandwidth instruction template corresponding to the host computer screen exists, transmitting the high-bandwidth instruction template to the client computer, wherein the low-bandwidth instruction template is different from the high-bandwidth instruction template.

35. The storage medium of claim 11, wherein a plurality of instruction templates exist, each template having an associated screen identifier, further comprising:
the server application framework further comprising determining a host screen identifier corresponding to the host computer screen; and wherein the determining whether an instruction template corresponding to the host computer screen exists includes determining whether an instruction template having an associated screen identifier that matches the host screen identifier exists.

36. The storage medium of claim 15, wherein the determining whether an instruction template corresponding to the host computer screen exists includes:
if an instruction template corresponding to the host computer does not exist, determining whether an alternate instruction template having an associated screen identifier that matches the host screen identifier exists, wherein the alternate instruction template corresponds to a computer screen of a second host computer; and
if the alternate instruction template exists, transmitting the alternate instruction template to the client computer.

37. A computer-readable storage medium storing code for controlling the transmission of information between a host computer and a remotely located client computer, wherein the, and the, the system comprising:
a client computer which includes a browser application and is linked to a server computer by a network;
a host computer which is linked to the server computer by a communications medium;
the server computer comprising:
a display control receiving, at the server computer, data that is transmitted from the host computer, the data representative of a host computer display screen; and
a host extension determining whether the data transmitted from the host computer includes at least one menu item field; if the data transmitted from the host computer includes at least one menu item field, creating at least one instruction that represents a hyperlink field corresponding to the menu item field; determining whether the data transmitted from the host computer includes at least one function key field; if the data transmitted from the host computer includes at least one function key-capable field, creating at least one instruction that represents a hyperlink field corresponding to the function key field; determining whether the data transmitted from the host computer includes at least one light pen-enabled field; if the data transmitted from the host computer includes at least one light pen-enabled field, creating at least one instruction that represents a hyperlink field corresponding to the light pen-enabled fields; determining whether the data transmitted from the host computer includes at least one function key-capable field; and if the data transmitted from the host computer includes at least one function key-capable field, creating at least one instruction that represents a button control corresponding to the function key-capable field.

38. A computer-readable storage medium storing code for controlling the transmission of information between a host computer and a remotely located client computer, the system comprising:

a client computer which includes a browser application and is linked to a server computer by a network;

a host computer which is linked to the server computer by a communication medium;

the server computer comprising:

a display control receiving, at the server computer, data that is transmitted from the host computer, the data representative of a host computer display screen having multiple fields and a cursor positioned in a focus field; and a host extension automatically creating a set of instructions representing web page fields corresponding to the fields of the host screen; determining that one of the web page fields is a cursor field corresponding to the focus field of the host screen; automatically creating at least one cursor positioning instruction in the set of instructions, the cursor positioning instruction representing the information that a cursor is to be positioned within the cursor field; and transmitting the set of instructions to the client computer.

39. The storage medium of claim 18, wherein the communication medium linking the host computer to the server computer is an SNA network and the data received from the host computer comprises a data stream including an insert cursor token indicative of the focus field.

40. The storage medium of claim 19, wherein the set of instructions includes instructions in the Hypertext Markup Language.

* * * * *